United States Patent
Mueller et al.

(10) Patent No.: US 7,638,466 B2
(45) Date of Patent: *Dec. 29, 2009

(54) THINNERS FOR INVERT EMULSIONS

(75) Inventors: Heinz Mueller, Monheim (DE); Jeff Kirsner, Humble, TX (US); Kimberly Burrows, Kingwood, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/432,786

(22) PCT Filed: Dec. 29, 2000

(86) PCT No.: PCT/US00/35610

§ 371 (c)(1),
(2), (4) Date: Dec. 10, 2003

(87) PCT Pub. No.: WO02/053676

PCT Pub. Date: Jul. 11, 2002

(65) Prior Publication Data

US 2004/0082483 A1    Apr. 29, 2004

(51) Int. Cl.
    *C09K 8/00* (2006.01)
(52) U.S. Cl. ................................. 507/136; 507/261
(58) Field of Classification Search ............. 507/136, 507/261

See application file for complete search history.

(56) References Cited

U.S. PATENT DOCUMENTS 2,816,073 A    12/1957    Stratton (Continued)

FOREIGN PATENT DOCUMENTS

AU    B 75043/94    3/1995

(Continued)

OTHER PUBLICATIONS

English translation of EP 0386636, an equivalent english translation of WO 90/10681A1, Sep. 1990.*

(Continued)

*Primary Examiner*—Randy Gulakowski
*Assistant Examiner*—Alicia M Toscano
(74) *Attorney, Agent, or Firm*—Craig W. Roddy; Karen B. Tripp

(57) ABSTRACT

A method of reducing the viscosity of invert emulsions and oil-based drilling fluids and well service fluids comprising such emulsions over a broad temperature range is disclosed. The method comprises adding to said invert emulsions of the invention a non-ionic surfactant alone or in combination with a co-thinner having the formula: $R''''-(C_2H_4O)_n(C_3H_6O)_m(C_4H_8O)_k-H$ where $R''''$ is a saturated or unsaturated, linear or branched, alkyl radical having about 8 to about 24 carbon atoms, n is a number ranging from about 1 to about 10, m is a number ranging from about 0 to about 10, and k is a number ranging from about 0 to about 10. The non-ionic surfactant is a reaction product of ethylene oxide, propylene oxide and/or butylene oxide with $C_{10-22}$ carboxylic acids or $C_{10-22}$ carboxylic acid derivatives containing at least in position 9/10 and/or 13/14 structural units of general formula (I) where $R_1$ is a hydrogen atom or an OH group or a group $OR_2$. $R_2$ is an alkyl group of about 1 to about 18 carbon atoms, an alkenyl group of about 2 to about 18 carbons atoms, or a group of the formula (II): $R_3$ is a hydrogen atom, an alkyl group of about 1 to about 21 carbon atoms or an alkylene group or 2 to 21 carbon atoms.

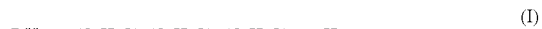
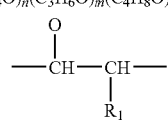
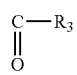

21 Claims, 8 Drawing Sheets

U.S. PATENT DOCUMENTS

| | | |
|---|---|---|
| 2,873,253 A | 2/1959 | Stanphill |
| 2,994,660 A | 8/1961 | Reddie et al. |
| 3,126,343 A | 3/1964 | Reddie et al. |
| 3,489,690 A * | 1/1970 | Viout et al. ............... 516/30 |
| 3,654,177 A | 4/1972 | Foley |
| 3,684,012 A | 8/1972 | Scheffel at al. |
| 3,728,277 A | 4/1973 | Foley |
| 3,878,110 A | 4/1975 | Miller et al. |
| 3,878,117 A | 4/1975 | Williams et al. |
| 3,912,683 A | 10/1975 | O'Farrell |
| 3,954,627 A | 5/1976 | Dreher et al. |
| 3,988,246 A | 10/1976 | Hartfiel |
| 4,007,149 A | 2/1977 | Burton et al. |
| 4,010,111 A | 3/1977 | Chappell et al. |
| 4,012,329 A | 3/1977 | Hayes et al. |
| 4,142,595 A | 3/1979 | Andreson et al. |
| 4,148,821 A | 4/1979 | Nussbaum et al. |
| 4,151,096 A | 4/1979 | Jackson |
| 4,153,588 A | 5/1979 | Makowski et al. |
| 4,207,421 A * | 6/1980 | Scardera et al. ............ 568/625 |
| 4,240,915 A | 12/1980 | Block |
| 4,255,268 A | 3/1981 | Block |
| 4,264,455 A | 4/1981 | Block |
| 4,366,070 A | 12/1982 | Block |
| 4,390,474 A | 6/1983 | Nussbaum et al. |
| 4,422,947 A | 12/1983 | Dorsey et al. |
| 4,425,462 A | 1/1984 | Tumer et al. |
| 4,428,845 A | 1/1984 | Block |
| 4,447,338 A | 5/1984 | Lundberg et al. |
| 4,473,479 A | 9/1984 | Block |
| 4,488,975 A | 12/1984 | Almond |
| 4,508,628 A | 4/1985 | Walker et al. |
| 4,552,215 A | 11/1985 | Almond et al. |
| 4,553,601 A | 11/1985 | Almond et al. |
| 4,559,233 A | 12/1985 | Chen et al. |
| 4,619,772 A | 10/1986 | Block et al. |
| 4,670,501 A | 6/1987 | Dymond et al. |
| 4,671,883 A | 6/1987 | Connell et al. |
| 4,777,200 A | 10/1988 | Dymond et al. |
| 4,787,990 A | 11/1988 | Boyd |
| 4,802,998 A | 2/1989 | Mueller et al. |
| 4,810,355 A | 3/1989 | Hopkins |
| 4,816,551 A | 3/1989 | Oehler et al. |
| 4,900,456 A | 2/1990 | Ogilvy |
| 4,941,983 A | 7/1990 | Coates et al. |
| 4,964,615 A | 10/1990 | Mueller et al. |
| 5,027,901 A | 7/1991 | French et al. |
| 5,045,219 A | 9/1991 | Trahan et al. |
| 5,106,516 A | 4/1992 | Mueller et al. |
| 5,189,012 A | 2/1993 | Patel et al. |
| 5,232,910 A | 8/1993 | Mueller et al. |
| 5,237,080 A * | 8/1993 | Daute et al. ............... 554/213 |
| 5,252,554 A | 10/1993 | Mueller et al. |
| 5,254,531 A | 10/1993 | Mueller et al. |
| 5,308,401 A | 5/1994 | Geke et al. |
| 5,318,954 A | 6/1994 | Mueller et al. |
| 5,318,955 A | 6/1994 | Mueller et al. |
| 5,318,956 A | 6/1994 | Mueller et al. |
| 5,330,662 A | 7/1994 | Janke et al. |
| 5,333,698 A | 8/1994 | Van Slyke |
| 5,382,290 A | 1/1995 | Nahm et al. |
| 5,401,439 A * | 3/1995 | Elfers et al. ............... 516/179 |
| 5,403,508 A | 4/1995 | Reng et al. |
| 5,403,822 A | 4/1995 | Mueller et al. |
| 5,407,909 A | 4/1995 | Goodhue, Jr. et al. |
| 5,432,152 A | 7/1995 | Dawson |
| 5,441,927 A | 8/1995 | Mueller et al. |
| 5,495,891 A * | 3/1996 | Sydansk ............... 166/295 |
| 5,498,596 A | 3/1996 | Ashjian et al. |
| 5,508,258 A | 4/1996 | Mueller et al. |
| 5,552,462 A | 9/1996 | Yeh |
| 5,569,642 A | 10/1996 | Lin |
| 5,589,442 A | 12/1996 | Gee et al. |
| 5,591,699 A | 1/1997 | Hodge |
| 5,605,879 A | 2/1997 | Halliday et al. |
| 5,607,901 A | 3/1997 | Troups, Jr. et al. |
| 5,620,946 A | 4/1997 | Jahnke |
| 5,635,457 A | 6/1997 | Van Slyke |
| 5,691,281 A | 11/1997 | Ashjian et al. |
| 5,710,110 A | 1/1998 | Cooperman et al. |
| 5,744,677 A | 4/1998 | Wu |
| 5,789,352 A | 8/1998 | Carpenter et al. |
| 5,837,655 A | 11/1998 | Halliday et al. |
| 5,846,913 A | 12/1998 | Sawdon |
| 5,849,974 A | 12/1998 | Clarembeau et al. |
| 5,851,958 A | 12/1998 | Halliday et al. |
| RE36,066 E | 1/1999 | Mueller et al. |
| 5,869,433 A | 2/1999 | Patel |
| 5,869,434 A | 2/1999 | Mueller et al. |
| 5,877,378 A | 3/1999 | Overstreet et al. |
| 5,909,779 A | 6/1999 | Patel et al. |
| 5,292,297 A | 7/1999 | Theroit et al. |
| 5,958,845 A | 9/1999 | Van Slyke |
| 5,960,878 A | 10/1999 | Nguyen et al. |
| 5,989,336 A | 11/1999 | Carpenter et al. |
| 6,001,790 A | 12/1999 | Schmitt et al. |
| 6,017,854 A | 1/2000 | Van Slyke |
| 6,022,833 A | 2/2000 | Mueller et al. |
| 6,034,037 A | 3/2000 | Van Slyke |
| 6,057,375 A * | 5/2000 | Wollenweber et al. ...... 516/133 |
| 6,090,754 A | 7/2000 | Chan et al. |
| 6,107,255 A | 8/2000 | Van Slyke |
| 6,110,874 A | 8/2000 | Van Slyke |
| 6,159,906 A | 12/2000 | McNally et al. |
| 6,165,946 A | 12/2000 | Mueller et al. |
| 6,180,572 B1 | 1/2001 | Mueller et al. |
| 6,187,719 B1 * | 2/2001 | Dino et al. ............... 507/129 |
| 6,204,224 B1 | 3/2001 | Quintero et al. |
| 6,211,119 B1 | 4/2001 | Herold et al. |
| 6,289,989 B1 * | 9/2001 | Mueller et al. ............... 166/311 |
| 6,310,106 B1 * | 10/2001 | Podubrin et al. ............ 516/189 |
| 6,339,048 B1 | 1/2002 | Santhananam et al. |
| 6,451,953 B1 | 9/2002 | Alibright |
| 6,462,096 B1 | 10/2002 | Dino et al. |
| 6,515,031 B2 | 2/2003 | Fefer |
| 6,589,917 B2 | 7/2003 | Patel |
| 6,620,770 B1 | 9/2003 | Kirsner et al. |
| 6,828,279 B2 | 12/2004 | Patel et al. |
| 6,861,393 B2 | 3/2005 | Temple et al. |
| 6,887,832 B2 * | 5/2005 | Kirsner et al. ............... 507/103 |
| 6,908,887 B2 | 6/2005 | Thaemlitz |
| 6,989,353 B2 | 1/2006 | Temple et al. |
| 7,008,907 B2 | 3/2006 | Kirsner et al. |
| 2001/0009890 A1 | 7/2001 | Patel et al. |
| 2003/0036484 A1 | 2/2003 | Kirsner et al. |
| 2003/0064897 A1 | 4/2003 | Kirsner et al. |
| 2003/0114316 A1 | 6/2003 | Patel et al. |
| 2003/0144153 A1 | 7/2003 | Kirsnee et al. |
| 2004/0043905 A1 | 3/2004 | Miller et al. |
| 2004/0082483 A1 | 4/2004 | Muller et al. |
| 2004/0102332 A1 | 5/2004 | Thompson et al. |
| 2004/0110642 A1 | 6/2004 | Thompson et al. |
| 2004/0152603 A1 | 8/2004 | Kirsner et al. |
| 2004/0171498 A1 | 9/2004 | Miller |
| 2005/0032652 A1 | 2/2005 | Kirsner et al. |
| 2005/0137093 A1 | 6/2005 | Miller |
| 2006/0073987 A1 | 4/2006 | Mueller et al. |
| 2007/0078060 A1 | 4/2007 | Kirsner et al. |
| 2007/0078061 A1 | 4/2007 | Kirsner et al. |
| 2007/0078062 A1 | 4/2007 | Kirsner et al. |
| 2007/0082822 A1 | 4/2007 | Kirsner et al. |

2007/0082824 A1    4/2007    Bell et al.

FOREIGN PATENT DOCUMENTS

| CA | 2 047 706 C | | 9/1990 |
|---|---|---|---|
| CA | 2 088 697 | | 2/1992 |
| CA | 2047706 C | * | 7/2002 |
| DE | 40 18 228 A | | 12/1991 |
| DE | 44 20 455 | | 12/1995 |
| DE | 196 43 857 | | 5/1998 |
| DE | 19643857 A1 | * | 5/1998 |
| DE | 196 43 840 A | | 7/1998 |
| EP | 0 124 194 A2 | | 11/1984 |
| EP | 0 134 173 | | 3/1985 |
| EP | 0 247 801 A2 | | 12/1987 |
| EP | 0 254 412 | | 1/1988 |
| EP | 0 561 608 A | | 9/1993 |
| EP | 1 111 024 A1 | | 6/2001 |
| EP | 1 424 380 A1 | | 6/2004 |
| GB | 2166782 A | | 5/1986 |
| GB | 2212192 A | | 7/1989 |
| GB | 2287052 | | 3/1996 |
| GB | 2309240 A | | 7/1997 |
| WO | WO 83/02949 | | 9/1983 |
| WO | WO 95/21225 | | 8/1985 |
| WO | WO 9010681 A1 | * | 9/1990 |
| WO | WO 93/23491 A | | 11/1993 |
| WO | WO 94/16030 | | 7/1994 |
| WO | WO 95/09215 | | 4/1995 |
| WO | WO 95 26386 | | 10/1995 |
| WO | WO 96 22342 | | 7/1996 |
| WO | WO 98/18882 | | 5/1998 |
| WO | WO 99 50370 A | | 10/1999 |
| WO | WO 00 71241 A | | 11/2000 |
| WO | WO 02/053675 A1 | | 7/2002 |
| WO | WO 02/053676 A1 | | 7/2002 |

OTHER PUBLICATIONS

J.E. Friedheim, et al, "Second Generation Synthetic Fluids in the North Sea: Are They Better?", 215-226, IADC/SPE 350061 (1996).
M.A. Legendre Zevallos, et al., "Synthetic-Based Fluids Enhance Environmental and Drilling Performance in Deepwater Locations," 235-242, SPE 35329 (1996).
E.A. Vik, et al, "Factors Affecting Methods for Biodegradation Testing of Drilling Fluids for Marine Discharge," 697-711, SPE 35981 (1996).
L. Bailey, et al., "Filtercake Integrity and Reservoir Damage," 111-120, SPE 39429, (1998).
P.A. Bern, et al., "Barite Sag: Measurement, Modeling and Management," IADC/SPE 47784 (9 pages) (1998).
N. Hands, et al., "Optimising Inflow Performance of a Long Multi-Lateral Offshore Well in Low Permeability Gas Bearing Sandstone: K14-FB 102 Case Study," SPE 50394 (1998) 14.
L. Xiao, et al., "Studies on the Damage Induced by Drilling Fluids in Limestone Cores," SPE 50711 (17 pages) (1999).
A. Meinhold, "Framework for a Comparative Environmental Assessment of Drilling Fluids Used Offshore," SPE 52746 (10 pages) (1999).
L.J. Fraser, et al., "Formation-Damaging Characteristics of Mixed Metal Hydroxide Drill-In Fluids and a Comparison with Polymer-Base Fluids," SPE 57714 (1999).
P.A. Bern, et al, "Barite Sag: Measurement, Modeling, and Management," SPE 62051, SPE Drill. & Completion 15(1) 25-30 (Mar. 2000).
A. Saasen, et al, "Prediction of Barite Sag Potential of Drilling Fluids from Rheological Measurements," SPE/IADC 29410 (Feb. 26-Mar. 2, 1995).
P.I. Reid, et al, "Field Evaluation of a Novel Inhibitive Water-Based Drilling Fluid for Tertiary Shales," SPE 24979 (Nov. 16-18, 1992).
W. Hite, et al, Better Practices and Synthetic Fluid Improve Drilling Rates, Oil & Gas J. Online (Feb. 20, 1995).
N. Hands, et al, "Drill-in Fluid Reduces Formation Damage, Increases Production Rates," Oil & Gas J. Online (1998).

J.P. Plank, "Water-Based Muds Using Synthetic Polymers Developed for High Temperature Drilling," Oil & Gas J. Online (1992).
Brookfield Instruction Manual for SSV Vane Standard Spindle Set.
Brookfield Press Release on Vane Spindles (Mar. 12, 2002), ThomasNet Product News Room.
EPA Development Document for Proposed Effluent Limitations Guidelines for Standards for Synthetic-Based Drilling Fluid and Other Non-Aqueous Drilling Fluids . . . (Feb. 1999).
Environmental Impacts of Synthetic Based Drilling Fluids, U.S. Dept of the Interior, Minerals Management Service, Aug. 2000.
EPA Environmental Assessment of Proposed Effluent Limitations Guidelines for Synthetic-Based Drilling Fluids and Other Non-Aqueous Drilling Fluids . . . (Feb. 1999).
"Horizontal Wells Offer Economic Advantage," Horizontal News, Fall 1996.
A. Saasen, et al, "Monitoring of Barite Sag Important in Deviated Drilling," Oil & Gas J. Online (1991).
Novadril (TM) System, MI Technology Report (1993).
G. Robinson et al, Novel Viscometer for Improved Drilling Fluid Characterization, Baker Hughes INTEQ (1996).
N.J. Alderman, et al, "Vane Rheometry of Bentonite Gels," 39 J. Non-Newtonian Fluid Mechanics 291-310 (1991).
API Recommended Practice Standard Procedure for Field Testing Oil-Based Drilling Fluids, API Rec. Prac. 13B--2, 3rd. ed. (Feb. 1998) American Petroleum Institute.
Depostion Transcript of David Carbajal, co-inventor of US 6,887,832, in Civil Action 6:05CV155, US Dist. Ct. (E.D. TX), Halliburton Energy Serv. v. M-I, LLC, (Jan. 12, 2006).
Deposition Transcript of Kimberly Burrows, co-inventor of US 6,887,832 in Civil Action 6:05CV155, US Dist. Ct. (E.D. TX), Halliburton Energy Serv. v. M-I, LLC, (Oct. 26, 2005).
Deposition Transcript of Don Siems, co-inventor of US 6,887,832 in Civil Action 6:05CV155, US Dist. Ct. (E.D. TX), Halliburton Energy Serv. v. M-I, LLC, (Dec. 12, 2005).
Deposition Transcript of Jeff Kirsner, co-inventor of US 6,887,832 in Civil Action 6:05CV155, US Dist. Ct. (E.D. TX), Halliburton Energy Serv. v. M-I, LLC, (Feb. 15, 2006).
Deposition Transcript of Karen Tripp, patent prosecuting attorney for US 6,887,832, CV 6:05CV155, US Dist. Ct. (E.D. TX), *Halliburton Energy Serv.* v. *M-I, LLC*, (Jan. 26, 2006).
First Amended Complaint, Civil Action No. 6:05CV155, U.S. Dist. Court, Eastern Dist. of Texas, Tyler Div., *Halliburton Energy Services, Inc.* v. *M-I, LLC*., filed Jan. 27, 1006.
M-I, LLC's 2nd Amended Answer, Affirmative Defenses, and Counterclaims, Civil Action No. 6:05CV155, U.S. Dist. Court, Eastern Dist. of Texas, Tyler Div., filed Feb. 10, 2006.
Plaintiff's Preliminary Infringement Contentions, Civil Action No. 6:05CV155, U.S. Dist. Court, Eastern Dist. of Texas, *Halliburton Energy Services, Inc.* v. *M-I LLC*, Sep. 16, 2005.
M-I, LLC's Preliminary Invalidity Contentions, CA No. 6:05CV155, U.S. Dist. Court, Eastern Dist. of Texas, *Halliburton Energy Services, Inc.* v. *M-I, LLC*, Oct. 28, 2005.
K. Burrows, et al., "New Low Viscosity Ester is Suitable for Drilling Fluids in Deepwater Applications," SPE 66553, Feb. 2001 (14 pages).
L.F. Nicora, "High-Density Invert-Emulsion System with Very Low Solids Content to Drill ERD and HPHT Wells," SPE 65000, Feb. 2001 (17 pages).
D. Eckhout, et al., "Development Process and Field Applications of a New Ester-based Mud Systems for ERD Wells on Australia's Northwest Shelf," IADC/SPE 62791 (Sep. 2002).
M. Mas, et al, "A New High-Temperature Oil-Based Drilling Fluid," SPE 53941, Venezuela Apr. 1999 (14 pages).
C. Cameron, et al, "Drilling Fluids Design and Management for Extended Reach Drilling," IADC/SPE 72290, Oct. 2001 (7 pages).
L. Knox, et al, "New Developments in Ester-based Mud Technology," AADE-02-DFWM-HO-41, Apr. 2002 (9 pages).
L.J. Fraser, "Field Application of the All-Oil Drilling Fluid," IADC/SPE 19955, Feb. 27-Mar. 2, 1990).
Halliburton's Proposed Terms and Claim Elements for Construction, CV 6.05CV155, US Dist. Ct. (E.D. TX), *Halliburton Energy Serv.* v *M-I, LLC*, Nov. 21, 2005.

Defendant M-I, L.L.C.'s List of Disputed Claim Terms, Civil Action No. 6:05CV155, U.S. Dist. Court, (E.D. TX), *Halliburton Energy Services, Inc.* v. *M-I LLC*, Nov. 21, 2005.

Plaintiff's Preliminary Claim Constructions Pursuant to Local Patent Rule 4-2, CV 6.05CV155, US Dist. Ct. (E.D. TX), *Halliburton Energy Serv.* v. *M-I, LLC*, Dec. 23, 2005.

Defendant M-I, LLC's Preliminary Claim Construction and Identification of Extrinsic Evidence for U.S. Patent No. 6,887,832, CV 6.05CV155, US Dist. Ct. (E.D. TX), Dec. 23, 2005.

Joint Claim Construction and Prehearing Statement Pursuant to P.R. 4-3, CV 6.05CV155, US Dist. Ct. (ED TX), *Halliburtin Energy Serv.* v. *M-I, LLC* Jan. 20, 2006.

Defendant M-I, LLC's Motion for Summary Judgment of Invalidity with Respect to U.S. Patent No. 6,887,832.

M-I LLC's Motion for Leave to Add Inequitable Conduct Defense to its Pleadings, CV 6.05CV155, US Dist. Ct. (ED TX), *Halliburton Energy Serv.* v. *M-I, LLC*, Jan. 26, 2006.

Plaintiff's Initial Disclosures, Civil Action 6.05CV155, US Dist. Ct. (ED TX), *Halliburton Energy Services, Inc.* v. *M-I, LLC*, Sep. 16, 2005.

Plaintiff's Initial Disclosures, Civil Action 6.05CV155, US Dist. Ct. (ED TX), *Halliburton Energy Services, Inc.* v. *M-I, LLC*, Sep. 16, 2005.

Defendant M-I, LLC's Initial Disclosures, Civil Action 6.05CV155, US Dist. Ct. (ED TX), *Halliburton Energy Services, Inc.* v. *M-I, LLC*, Aug. 19, 2005.

Plaintiff Halliburton's Objections and Responses to Defendant M-I LLC's First Set of Requests for Production, Civil Action 6.05CV155, *Halliburton* v. *MI*, Aug. 26, 2005.

Plaintiff Halliburton's Objections and Responses to Defendant M-I LLC's First Set of Interrogatories, Civil Action 6.05CV155, *Halliburton* v. *MI*, Aug. 26, 2005.

Plaintiff Halliburton's Supplemental Responses and Objections to Defendant M-I LLC's First Set of Interrogatories, Civil Action 6.05CV155, *Halliburton* v. *MI*, Oct. 25, 2005.

M-I, LLC's Responses to Plaintiff's First Set of Interrogatories to Defendant (Nos. 1-21), Civil Action 6.05CV155, US Dist. Ct. (ED TX), *Halliburton* v. *MI*, Nov. 16, 2005.

Halliburton's Opening Brief on Claim Construction,Civil Action 6.05CV155, US Dist. Ct. (ED TX), *Halliburton Energy Services, Inc.* v. *M-I, LLC*, Mar. 17, 2006.

Halliburton's Unopposed Motion for Leave to Exceed Page Limit for its Markman Brief, CV 6.05CV155, US Dist. Ct., *Halliburton Energy Services, Inc.* v. *M-I, LLC*, Mar. 17, 2006.

Defendant M-I, LLC's Reply in Support of its Motion for Summary Judgment of Invalidity with Respect to U.S. Patent No. 6,887,832 with exhibits.

M-I, LLC's Responsive Brief on the Construction of the Asserted Claims of U.S. Patent No. 6,887,832 with exhibits.

Halliburton's Unopposed Motion for Leave to Exceed Page Limit for its Surreply in Opposition to M-I's Motion for Summary Judgment of Invalidity with the Surreply and other exh.

Halliburton's Unopposed Motion for Leave to Exceed Page Limit for Reply Brief on Claim Construction with the Reply Brief and other exhibits.

Baroid Drilling Fluids Product Information Sheet on RM-63, Rheology Modifier (1990) (2 pages).

Baroid Drilling Fluids Product Data Sheets (1993) (121 pages).

Manual of Drilling Fluids Technology, Fundamental Characteristics of Drilling Fluids, NL Baroid/NL Industries, Inc. (1979) (22 pages).

Halliburton Drilling Fluids Technology—Introduction to Drilling, Dril-N & Completion Fluids.

Minute Entry for Markman Hearing Proceedings in *Halliburton* v. *M-I*, 6-05cv155, U.S. District Ct., Eastern District of Texas.

Transcript of Markman Hearing Before Hon. L. Davis in *Halliburton* v. *M-I*, 6-05cv155, U.S. District Ct., Eastern District of Texas.

Baroids's Environmentally Safe Fluids—Petrofree LV, Accolade (31 pages).

Baroid, A Halliburton Co., Res. & Eng. Tech. & Analytical Serv./Support, Field Support for . . . OCS-G 18273, MC 705 #1 (FS-0082)—Utilizing . . . Petrofree SF . . . Feb. 4, 2000.

Baroid, A Halliburton Co., Report FM-0691, Proj. Q3767, Formation Work on an 11, 14 & 16 lb/gal IO drilling fluid, Internal Memorandum, Nov. 5, 1999 (22 pages).

Baroid Drilling Fluids, REs. & Eng. Tech. & Anal. Serv./Support (TS-0865), Formulation of a 13.4 lb/gal Petrofree mud, Dec. 16, 1994.

Baroid, A Halliburton Company, Internal Mem., Report No. FMm-0804, Project No. Q4701, Fann 75 on Nova Plus field mud, May 1, 2000.

Evaluation of Field Trial of Petrofree LV, Final Sample collected before running casing, Jul. 25, 2000 (HAL0021065) one page.

Westport Technology Center International, Drilling Fluids, and Cement, Analysis of Baroid Peterfree Synthetic Mud, WTCI-94-133, Nov. 1994.

Baroid Rhemod L modified fatty acid Suspension Agent/Viscosifier product information sheet (1 page) 2001.

Halliburton's Opposition to Defendant's Motion for Summary Judgment of Invalidity in Civ. Action 6:05-CV-155, *Halliburton* v. *MI*, US Dist. Ct., Eastern Dist. of Texas.

Memorandum and Opinion of Court signed Oct. 18, 2006 in Civ. Action 6:05-CV-155, *Halliburton* v. *MI*, US Dist. Ct., Eastern Dist. of TX, granting MI's Mot. for Summary Judgement.

U.S. PTO Office Action of Nov. 10, 2005 in U.S. Appl. No. 10/656,684.

U.S. PTO Office Action of Jul. 21, 2006 in U.S. Appl. No. 10/656,684.

U.S. PTO Office Action of Jul. 17, 2006 in U.S. Appl. No. 10/933,560.

U.S. PTO Office Action of Jun. 4, 2004 in U.S. Appl. No. 10/175,272.

U.S. PTO Notice of Allowance of Dec. 1, 2004 in U.S. Appl. No. 10/175,272.

U.S. PTO Office Action of Jun. 27, 2006 in U.S. Appl. No. 10/432,787.

PCT International Search Report in PCT/US00/35609 corresponding to U.S. Appl. No. 10/432,787.

U.S. PTO Office Action of Oct. 4, 2002 in U.S. Appl. No. 09/929,465.

U.S. PTO Office Action of Jun. 24, 2003 in U.S. Appl. No. 09/929,465.

U.S. PTO Office Action of Apr. 16, 2004 in U.S. Appl. No. 09/929,465.

U.S. PTO Office Action of Jan. 21, 2005 in U.S. Appl. No. 09/929,465.

U.S. PTO Office Action of Sep. 29, 2005 in U.S. Appl. No. 09/929,465.

U.S. PTO Notice of Allowance of Apr. 11, 2006 in U.S. Appl. No. 09/929,465.

U.S. PTO Office Action of May 31, 2006 in U.S. Appl. No. 10/761,552.

PCT International Preliminary Examination Report in PCT/US00/35609 corresponding to U.S. Appl. No. 10/432,787.

PCT International Preliminary Examination Report in PCT/US00/35610 corresponding to U.S. Appl. No. 10/432,786.

PCT International Search Report in PCT/US00/35610 corresponding to U.S. Appl. No. 10/432,786.

U.S. PTO Office Action of Jul. 17, 2006 in U.S. Appl. No. 10/292,124.

U.S. PTO Office Action of Sep. 27, 2005 in U.S. Appl. No. 10/292,124.

U.S. PTO Office Action of Jun. 29, 2005 in U.S. Appl. No. 10/292,124.

U.S. PTO Office Action of Jan. 12, 2005 in U.S. Appl. No. 10/292,124.

EPC Article 96(2) Examination Report of Feb. 10, 2006 for European Patent Application No. 00989596.2—corresponding to U.S. Appl. No. 10/432,786.

EPC Article 96(2) Examination Report of Apr. 20, 2006 for European Patent Application No. 00989597.0—corresponding to U.S. Appl. No. 10/432,787.

JA Toups, Jr., Westport Technology Center International, Report of Fann 70 Testing of Nine OBM Drilling Fluid Samples from M-I, Inteq, and Baroid for BP Amoco, Aug. 2001.

M-I Internal Lab Test Report Memorandum to Jim Friedheim from John Lee on Pilot Test of SBM from Crosby, Report #RD000426-JL001, Apr. 26, 2000 (1 page).

Halliburton Energy Services, Baroid Technology, Eng. & Dev. Lab. Tech. Serv. (TS-2058), Dimer & Trimer Eval. as Primary Viscofiers Using . . . Petrofree SF, Apr. 17, 2001.

Halliburton Energy Services, Baroid Technology, Eng. & Dev. Lab. Tech. Serv. (TS-2055), Addition of Dimer & Trimer Modifiers to MI NOVADRIL Drilling Fluid . . . Apr. 4, 2001.

Halliburton Energy Services, Baroid Technology, Eng. & Dev. Lab. Tech. Serv. (TS-2039), Primary Rheological Evaluation Using Various Dimer & Trimer Acids, Feb. 21, 2001.

Halliburton Energy Services, Baroid Technology, Eng. & Dev. Lab. Tech. Serv. (TS-2037), Rheological Modifiers Evaluation Using Various Dimer & Trimer Acids, Feb. 21, 2001.

Halliburton Energy Services, Baroid Technology, Eng. & Dev. Lab. Tech. Serv. (TS-2065), Dimer & Trimer Low-End Rheology Modifier Study at Higher Conc. & Temp., Jun. 12, 2001.

Baroid Drilling Fluids, Res. & Eng. Tech. & Anal. Serv/Support (TS-0724), Fann 70 Analysis of Petrofree Muds . . . Nov. 12, 1993.

Baroid Report No. EMB 5680, Project No. M386, Analysis of a Petrofree mud, Aug. 8, 1995.

Baroid Report No. EMB 5723, Project No. M656, Analysis of a Petrofree mud, Dec. 11, 1995.

Baroid Report No. EMB 5718, Project No. M630, Analysis of a Petrofree mud, Dec. 1, 1995.

Baroid Drilling Fluids Res. & Eng. Tech. & Anal. Serv/Support (TS-1146S1) Comp. of Downhole Rheological & Suspension Prop. of a Petrofree mud vs Petrofree LE mud, Nov. 22, 1996.

Baroid Drilling Fluids Res. & Dev., Report No. EMB 5408, Project No. 1559. Test of a Submitted Sample (of a Petrofree mud), Jul. 12, 1994.

Baroid, a Halliburton Co., Internal Memorandum, Report No. FM-0691, Project No. Q3767, Formulation Work on an 11, 14 & 16 lb/gal. IO Drilling Fluids, Nov. 5, 1999.

Baroid Drilling Fluids, Res. & Eng. Tech. & Anal. Serv/Support (TS-1037), Rheological Properties of Petrofree after Aging at Low & High Temperatures, Mar. 19, 1996.

Baroid Drilling Fluids, Res. & Eng. Tech. & Anal. Serv/Support (EMB-5530), Analysis of Petrofree Muds & Coatings from a Well . . . , Jan. 27, 1995.

Halliburton, Baroid Tech., Eng. & Dev. Lab., Internal Memo., Report No. FM-1376, Project No. Q4701, Fann 75 Rheological Properties on the NovaPlus Fluids. Jul. 30, 2002.

Baroid Drilling Fluids, Res. & Eng. Tech. & Anal. Serv/Support (TS-0842), Eval. & Reconditioning of a Petrofree mud, Oct. 7, 1994.

Baroid Drilling Fluids, Res. & Eng. Tech. & Anal. Serv/Support (TS-0858), Determination of the Maximum Density for a 60/40 Eser/Water Ratio Petrofree mud, Dec. 12, 1994.

Baroid Drilling Fluids, Res. & Eng. Tech. & Anal. Serv/Support Field Services. Report (FS-0058), relating to Petrofree LE, Nov. 14-Dec. 3, 1996.

Baroid Drilling Fluids, Res. & Eng. Tech. & Anal. Serv/Support (TS-1193), Analysis of Petrofree LE Muds to Determinate the Cause of High Viscosities at Cold Temp. Jan. 30, 1997.

Baroid, a Halliburton Co., Res. & Eng. Tech. & Anal. Serv/Support (FS-0082), Field Support for Utilizing a 13.0 lb/gal. 75/25 Petrofree SF Drilling Fluid, Feb. 4, 2000.

Baroid Drilling Fluifd, Res. & Eng. Tech. & Anal. Serv/Support Field Service (FS-0058S2) relating to Petrofree LE, Jan. 24, 1997.

Baroid, a Hallinburton Co. Res. & Eng. Tech. & Anal. Serv/Support. Field Support (FS-0080) Utilizing an 11/2 lb/gal. Petrofree IO Drilling Fluid, Dec. 29, 1999.

Baroid Drilling Fluids, Res. & Eng. Tech. & Anal. Serv/Support (TS-0906), Formulation of an Enviromul and Petrofree mud Weighted with Baracarb, May 9, 1985.

Baroid Drilling Fluids, Res. & Eng. Tech. & Anal. Sev/Support (TS-0870), Formulation of a Low Yield Point Mud, Jan. 11, 1995.

Baroid Drilling Fluids, Res. & Eng. Tech. & Anal.Serv/Support (TS-0494), A 15 lb./gal. Petrofree Formulation . . . Nov. 22, 1991.

Baroid Drilling Fluids, Res. & Eng. Tech. & Anal. Serv/Support (TS-0485), 300 F Static Aging Evaluation of *Petrofree* vs. *Enviromul*, Nov. 6, 1991.

Baroid Drilling Fluids, Res. & Eng. Tech. & Anal./Serv/Support, Field Service Report, Dec. 2, 1996-Dec. 16, 1996 (FS-0058S1), Feb. 11, 1997.

Baroid, a Halliburton Co., Test of a Petrofree LV Mud Sample. Jul. 10, 2000.

Baroid's Environmentally Safe Fluids Petrofree LV Accolade.

Comparison of Petrofree, Internal Olefin, and Low Viscosity Ester Muds, 40 F to 250 F, 0 PSI to 12,000 PSI (Not dated) 16 pages.

Baroid. Halliburton, "Low Viscosity Ester Fluids," Technical Review (not dated) 50 pages.

Baroid Res. & Eng. Lab. Comparative Data, "Petrofree SF & Petrofree LE," 11.0 lb/gal. 70/30 OWR.

Baroid, a Halliburton Co., Internal Memorandum, Report No. FM-0700, Project No. Q3854, Extended Gel Strengths for a Low Viscosity Ester Mud and a Petrofree mud, Nov. 11, 1999.

Baroid Drilling Fluids, Res. & Eng. Tech. & Anal. Serv/Support (EMB-5696), Adjustment of a Stored Petrofree Mud to Meet Specifications Required, Oct. 6, 1995.

Thinner Evaluation. 11.0 lb./gal., 70/30 OWR Petrofreemud. Thinners Evaluated; COLDROL, ATC, BDF-239, QMC 42, Deep Treat.

Deposition Transcript of Heinz Mueller in civil action 6:05 cv 155, *Halliburton* v. *M-I Drilling*. US District Court, Eastern District of Texas.

U.S. Court of Appeals for the Federal Circuit opinion of Jan. 25, 2008 in *Halliburton Energy Services, Inc.* v. *M-I, LLC*, 2007-1149, re US Patent No. 6,887,832 (21 pages).

Baroid, a Halliburton Co., Res. & Eng. Tech. & Anal. Serv./Support (FS-0080), Field Support . . . Utilizing 11/2/lb/gal., Petrofree IO Drilling Fluid, Dec. 29, 1999 (2 pages).

MI Versamul multi-purpose emulsifier Product Bulletin (2 pages), 1996.

MI Versathin deflocculant Product Bulletin (2 pages), 1996.

MI Versawet organic surfactant Product Bulletin (2 pages), 1996.

MI Versamod organic gelling agent Product Bulleting (2 pages), 1996.

MI Versapac rheological additive Product Bulletin (2 pages), 1999.

MI Versalig amine-treated lignite filtration control additive Product Bulletin (2 pages) 1997.

MI Versalube lubricant Product Bulletin (2 pages) 1999.

MI Novamod organic gelling agent liquid rheology modifier Product Bulletin (2 pages) 1997.

Baroid ADAPTA copolymer HPHT Filtration Reducer Product Data Sheet (1 page) Sep. 5, 2006.

Baroid Report No. EMB 5680, Project No. M386, Analysis of a Petrofree mud, Aug. 8, 1995.

Baroid Report No. EMB 5723, Project No. M656, Analysis of a Petrofree mud, Dec. 11, 1995.

Baroid Report No. EMB 5718, Project No. M630, Analysis of a Petrofree mud, Dec. 11, 1995.

Baroid Drilling Fluids Res. & Eng. Tech. & Anal. Serv./Support (TS-1146S1) Comp. of Downhole Rheological & Suspension Prop. of a *Petrofree mud* vs *Petrofree LE mud*, Nov. 22, 1996.

Baroid Drilling Fluids Res. & Dev., Report No. EMB 5408, Project No. 1559, Test of a Submitted Sample (of a Petrofree mud), Jul. 12, 1994.

Baroid Drilling Fluids, Res. & Eng. Tech. & Anal. Serv./Support (TS-0858), Determination of teh Maximum Density for a 60/40 Ester/Water Ratio Petrofree mud, Dec. 12, 1994.

Baroid Drilling Fluids, Res. & Eng. Tech. & Anal. Serv./Support Field Services, Report (FS-0058), relating to Petrofree LE, Nov. 14-Dec. 3, 1996.

Baroid Drilling Fluids, Res. & Eng. Tech. & Anal. Serv./Support Field Service (FS-0058S2) relating to Petrofree LE, Jan. 24, 1997.

Baroid, a Halliburton Co., Res. & Eng. Tech. & Anal. Serv./Support (FS-0080), Field Support, Utilizing an 11/2 lb/gal., Petrofree IO Drilling Fluid, Dec. 29, 1999.

Halliburton, Baroid Tech., Eng. & Dev. Lab., Internal Memo., Report No. FM-1376, Project No. Q4701, Fann 75 Rheological Properties on the NovaPlus Fluids, Jul. 30, 2002.

\* cited by examiner

THINNERS FOR INVERT EMULSIONS

BACKGROUND OF THE INVENTION

1. Field of the Invention

This invention is generally related to methods and compositions for drilling and servicing wellbores in hydrocarbon bearing subterranean formations. Particularly, this invention is related to oil-based drilling fluid systems comprising water-in-oil invert emulsions, and to thinners that enhance or enable use of such fluids over a broad temperature range.

2. Description of Relevant Art

A drilling fluid, or "mud" which a drilling fluid is also often called, is a specially designed fluid that is circulated in a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

A drilling fluid typically comprises water and/or oil or synthetic oil or other synthetic material or synthetic fluid ("synthetic") as a base fluid, with solids in suspension. A non-aqueous based drilling fluid typically contains oil or synthetic as a continuous phase and may also contain water dispersed in the continuous phase by emulsification so that there is no distinct layer of water in the fluid. Such dispersed water in oil is generally referred to as an invert emulsion or water-in-oil emulsion.

A number of additives may be included in such oil based drilling fluids and invert emulsions to enhance certain properties of the fluid. Such additives may include, for example, emulsifiers, weighting agents, fluid-loss additives or fluid-loss control agents, viscosifiers or viscosity control agents, and alkali. Further general discussion and description of oil-based drilling fluids is provided in P. A. Boyd, et al., New Base Oil Used In Low Toxicity Oil Muds, Journal of Petroleum Technology, pages 137-142 (1985), which is incorporated herein by reference.

An essential criterion for assessing the utility of a fluid as a drilling fluid or as a well service fluid is the fluid's rheological parameters, particularly under drilling and wellbore conditions. For use as a drilling fluid, or as a fluid for servicing a well, the fluid must be capable of maintaining certain viscosities suitable for drilling and circulation in the wellbore. Preferably, a drilling fluid will be sufficiently viscous to be capable of supporting and carrying to the surface of the well drill cuttings without being so viscous as to interfere with the drilling operation. Moreover, a drilling fluid must be sufficiently viscous to be able to suspend barite and other weighting agents. However, increased viscosity can result in problematic sticking of the drill string, and increased circulating pressures can contribute to lost circulation problems.

Thinners may be added to the drilling fluid or drilling mud systems before and in the course of drilling. Anionic surfactants particularly from the group of the fatty alcohol sulfates, the fatty alcohol ether sulfates and the alkylbenzenesulfonates are examples of such thinners known in the prior art. Although such compounds have been shown to effect thinning of drilling fluids, their effectiveness as thinners is not always uniform over the entire range of temperatures (typically as low as about 40° F. (or lower) to as high as about 250° F. (or higher)) at which drilling fluids are used.

Thinners and other additives to drilling fluids, as well as drilling fluids employed in onshore and offshore wells, must commonly meet stringent environmental regulations related to biodegradability and toxicity. Further, drilling fluids and additives to drilling fluids must be able to withstand subterranean conditions that the fluids will typically encounter in a wellbore, such as high temperatures, high pressures, and pH changes.

A need exists for improved rheology-modifying or viscosity reducing additives to oil-based drilling fluids, and particularly to drilling fluids comprising invert (water-in-oil) emulsions, which are capable of being used over a broad range of temperatures. As used herein, unless indicated otherwise, a "broad temperature range" shall be understood to generally mean temperatures ranging from about 14° F. to about 350° F. and preferably ranging from about 40° F to about 250° F.

SUMMARY OF THE INVENTION

According to the method of the present invention, at least one compound or composition is added to a water-in-oil or invert emulsion, or a drilling fluid or well service fluid comprising such emulsion, which reduces the viscosity of the emulsion over a broad temperature range or which enables or enhances the ability of the emulsion to maintain its viscosity over a broad temperature range. The compound or composition, which may be generally called a "thinner," continues to have this effect in a drilling fluid or well service fluid comprising the emulsion for use in drilling or servicing wellbores in subterranean formations, particularly hydrocarbon bearing subterranean formations, over a broad temperature range. The first such thinner compound of the present invention is a non-ionic surfactant which is a reaction product of ethylene oxide, propylene oxide and/or butylene oxide with $C_{10}$ carboxylic acids or $C_{10-22}$ carboxylic acid derivatives containing at least one double bond in position 9/10 and/or 13/14 having units of the general formula:

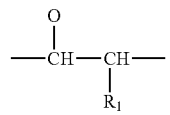

where $R_1$ is a hydrogen atom or an OH group or a group $OR_2$, where $R_2$ is an alkyl group of about 1 to about 18 carbon atoms, or an alkenyl group of about 2 to about 18 carbon atoms or a group of the formula:

where $R_3$ is a hydrogen atom, or an alkyl group of about 1 to about 21 carbon atoms or an alkylene group of about 2 to about 21 carbon atoms.

This first thinner compound may be used alone or may be used in combination with a second or other thinner or "co-thinner" compound having the following formula:

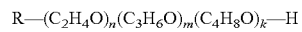

where R is a saturated or unsaturated, linear or branched, alkyl radical having about 8 to about 24 carbon atoms, n is a number ranging from about 1 to about 10, m is a number ranging from about 0 to about 10, and k is a number ranging from about 0 to about 10.

The invention also comprises an invert emulsion drilling fluid or well service fluid containing this first thinner compound, or containing said first thinner compound in combination with said second thinner compound.

DETAILED DESCRIPTION OF PREFERRED EMBODIMENTS

Figure 1:
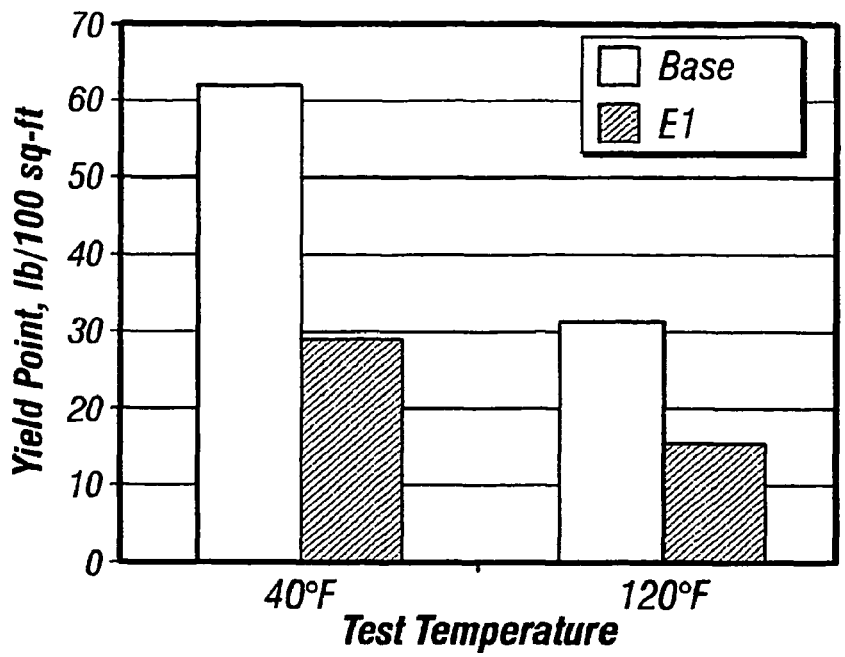
FIG. 1 is a graph comparing yield point of mud systems with and without thinners of the invention tested as reported in Table 2.
Figure 2:
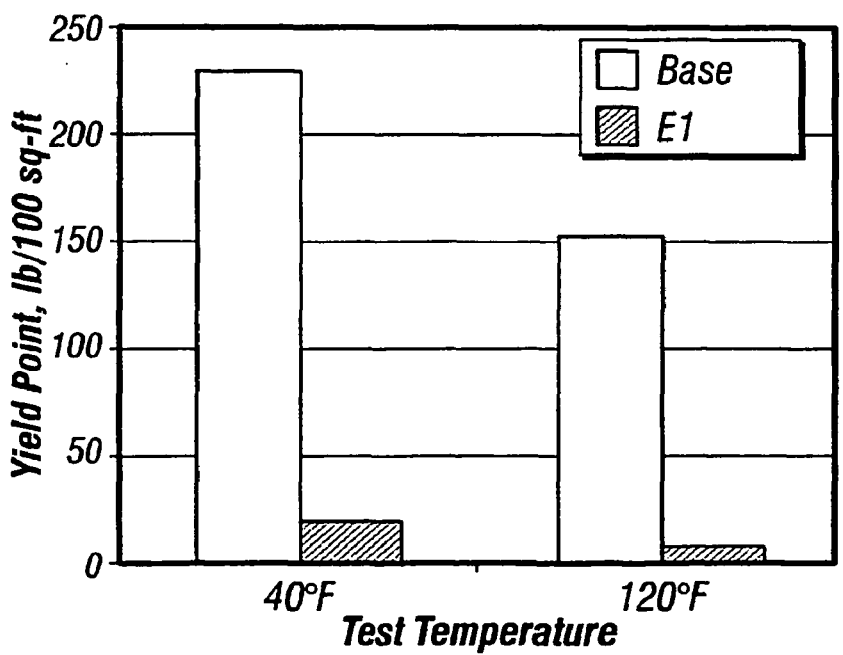
FIG. 2 is a graph comparing yield point of mud systems with and without thinners of the invention tested as reported in Table 3.
Figure 3:
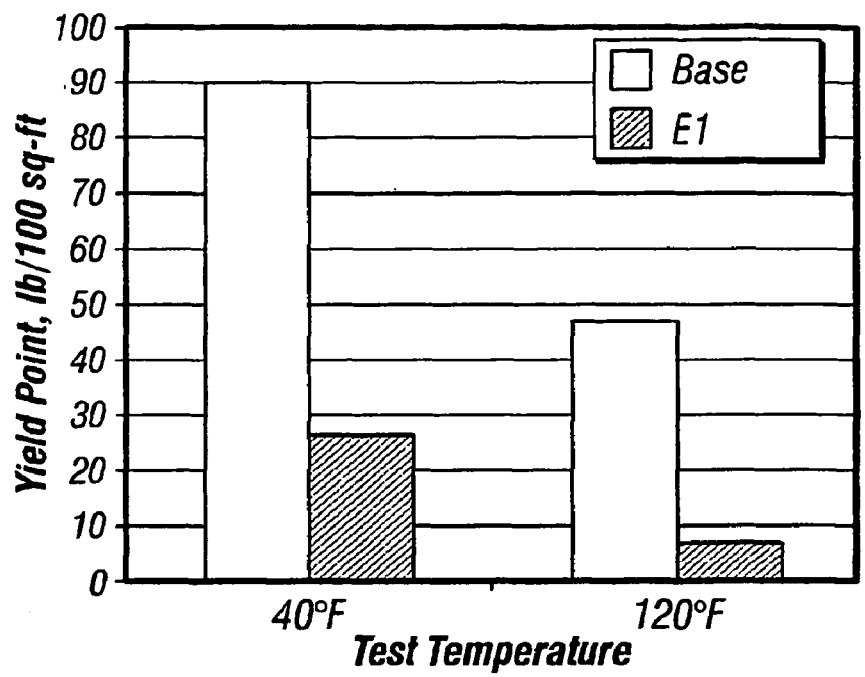
FIG. 3 is a graph comparing yield point of mud systems with and without thinners of the invention tested as reported in Table 4.
Figure 4:
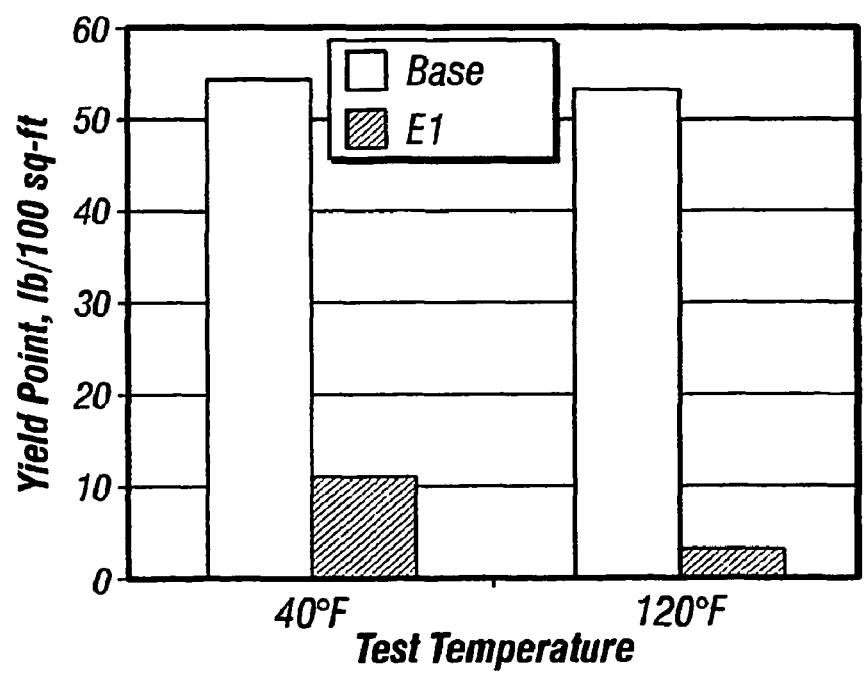
FIG. 4 is a graph comparing yield point of mud systems with and without thinners of the invention tested as reported in Table 5.
Figure 5:
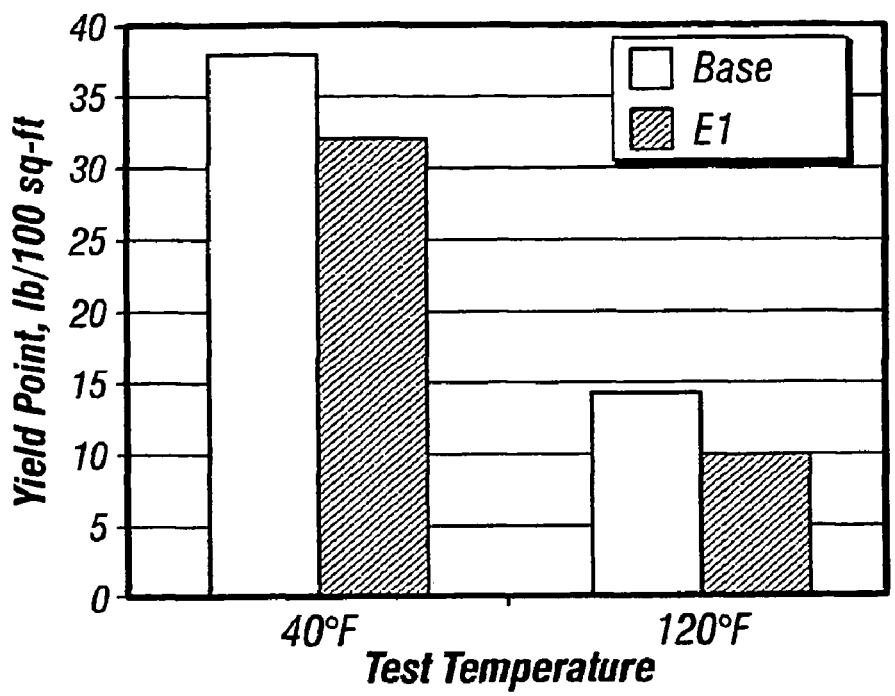
FIG. 5 is a graph comparing yield point of mud systems with and without thinners of the invention tested as reported in Table 6.
Figure 6:
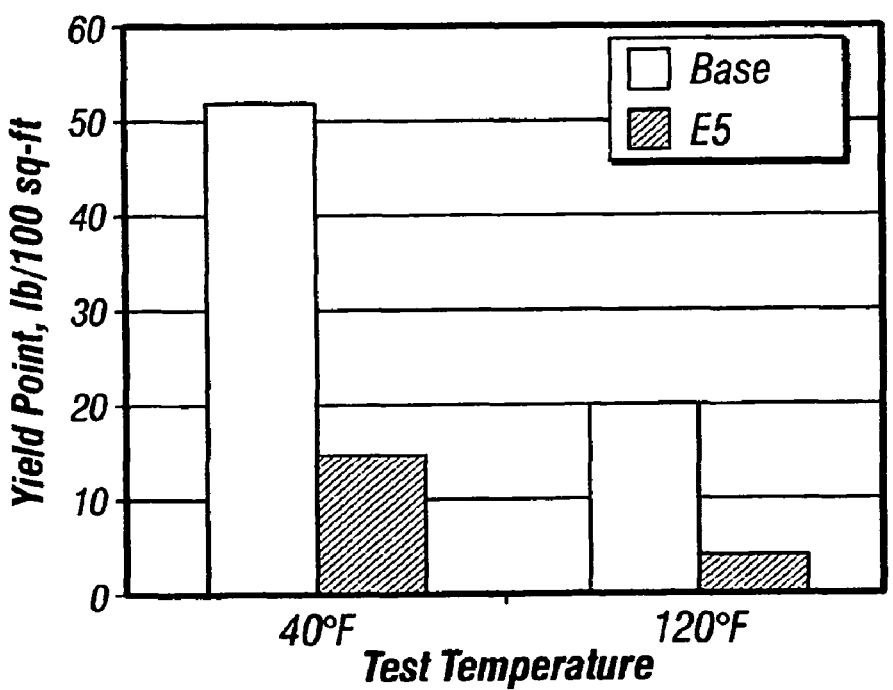
FIG. 6 is a graph comparing yield point of mud systems with and without thinners of the invention tested as reported in Table 7.
Figure 7:
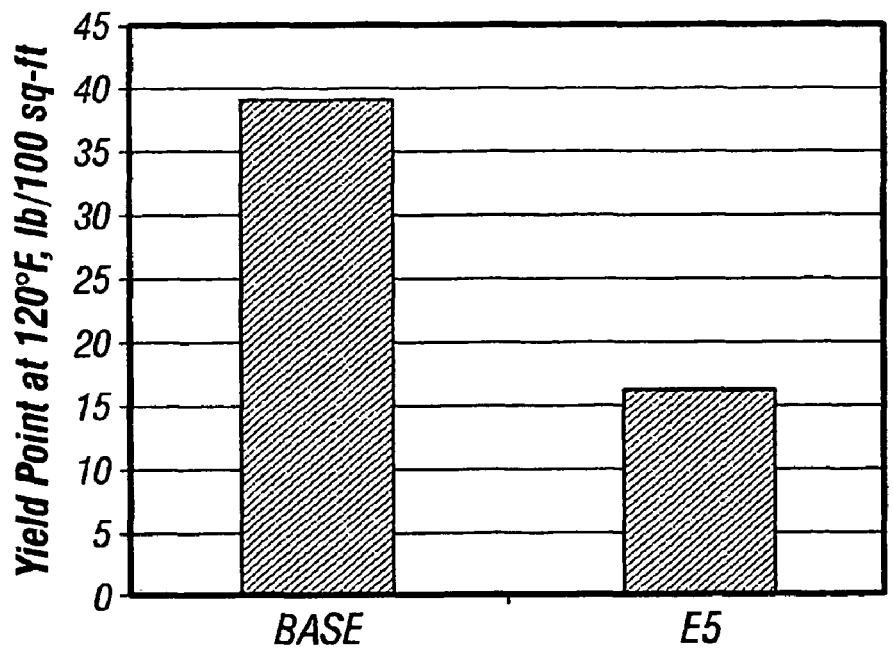
FIG. 7 is a graph comparing yield point of mud systems with and without thinners of the invention tested as reported in Table 8.
Figure 8:
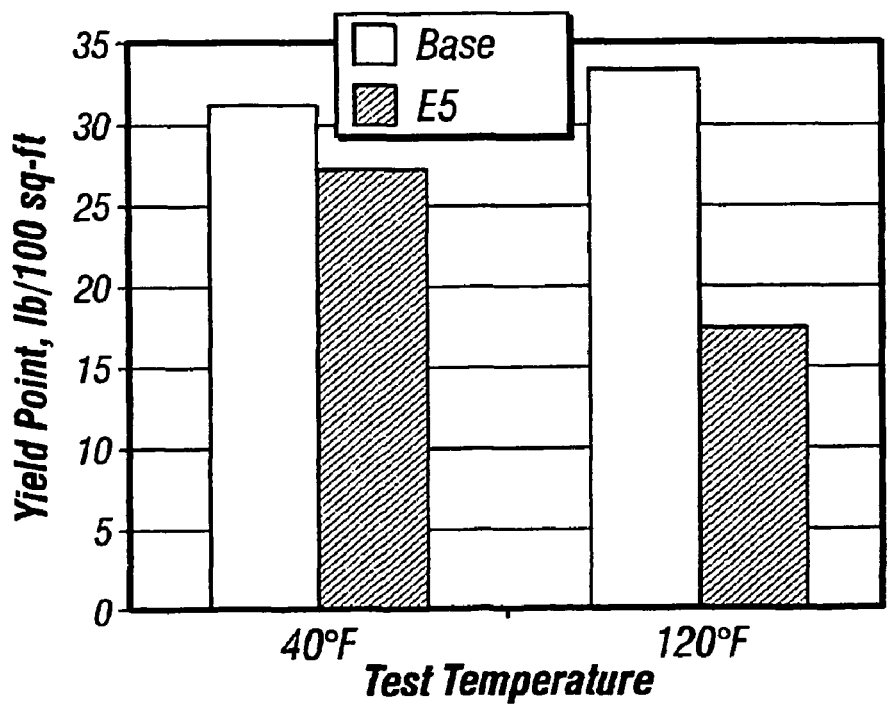
FIG. 8 is a graph comparing yield point of mud systems with and without thinners of the invention tested as reported in Table 9.
Figure 9:
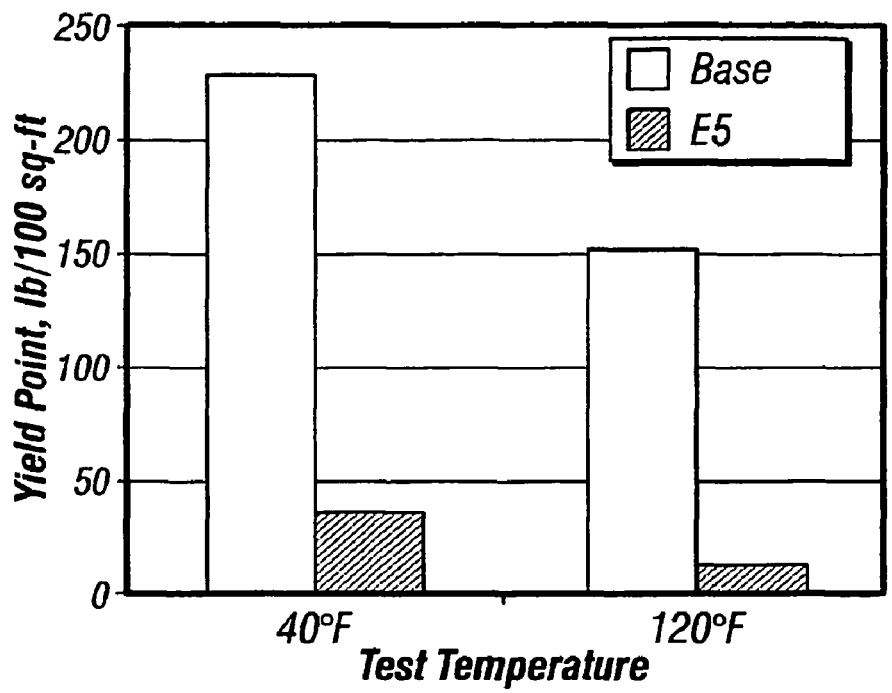
FIG. 9 is a graph comparing yield point of mud systems with and without thinners of the invention tested as reported in Table 10.
Figure 10:
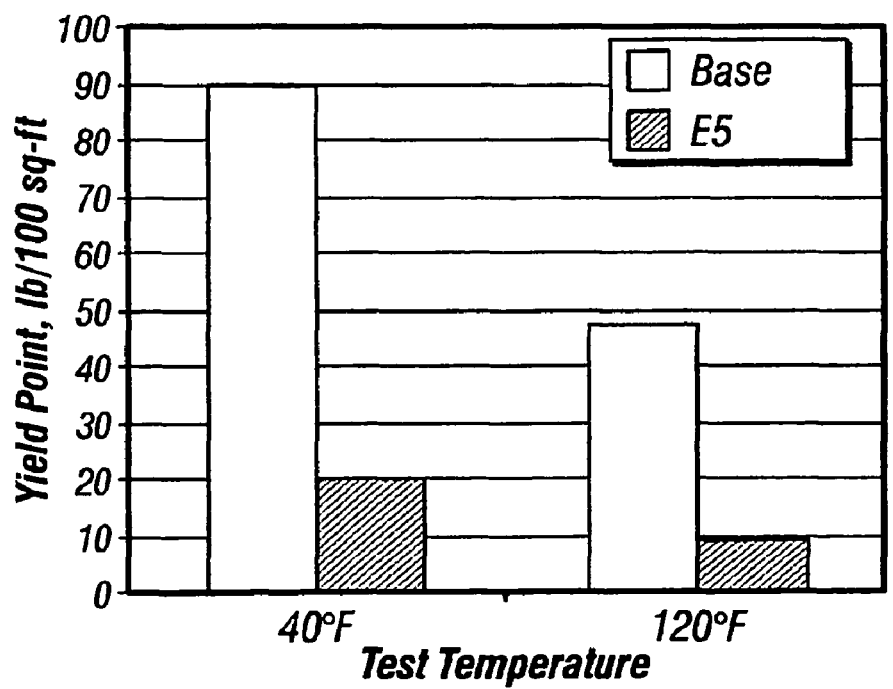
FIG. 10 is a graph comparing yield point of mud systems with and without thinners of the invention tested as reported in Table 11.
Figure 11:
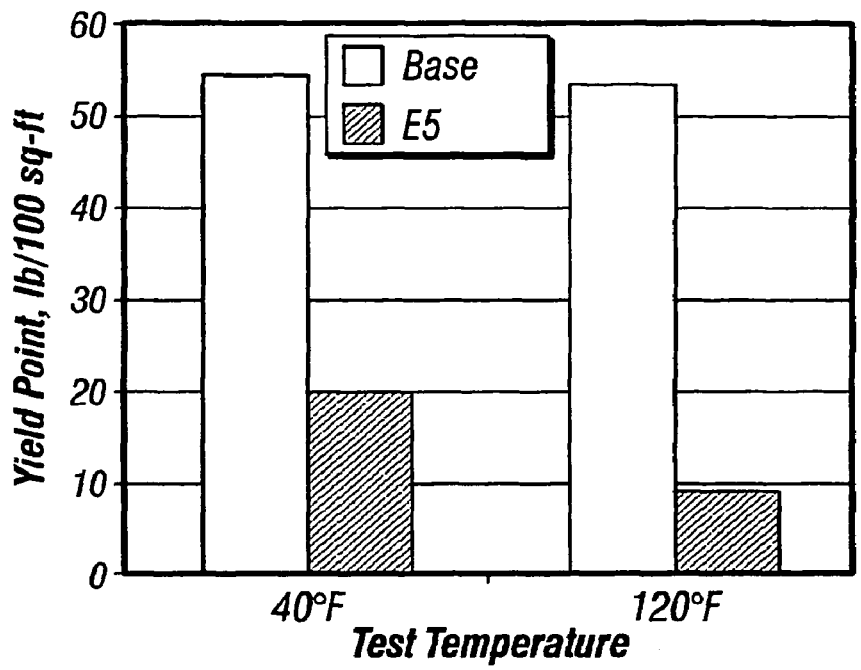
FIG. 11 is a graph comparing yield point of mud systems with and without thinners of the invention tested as reported in Table 12.
Figure 12:
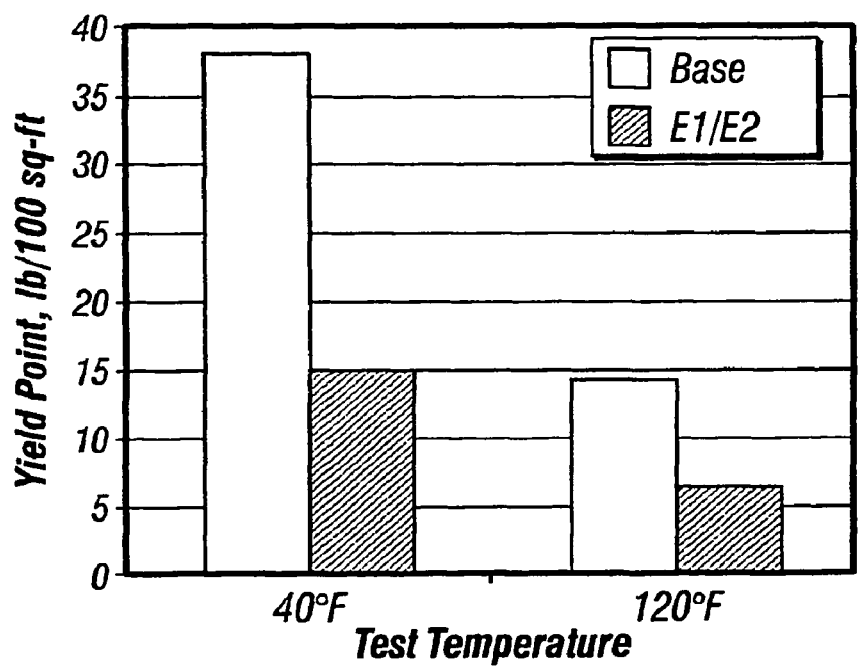
FIG. 12 is a graph comparing yield point of mud systems with and without thinners of the invention tested as reported in Table 13.
Figure 13:
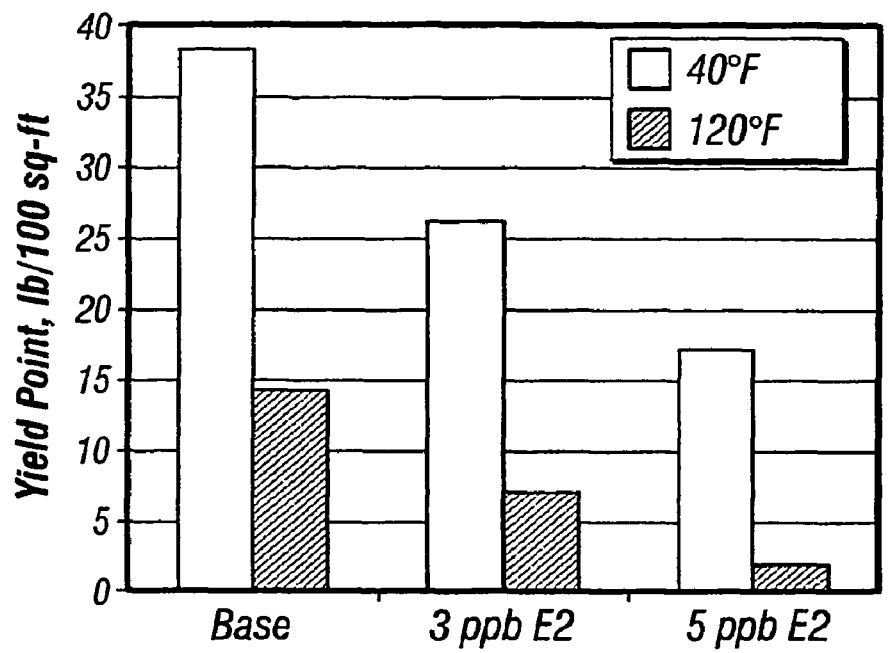
FIG. 13 is a graph comparing yield point of mud systems with and without thinners of the invention tested as reported in Table 14.
Figure 14:
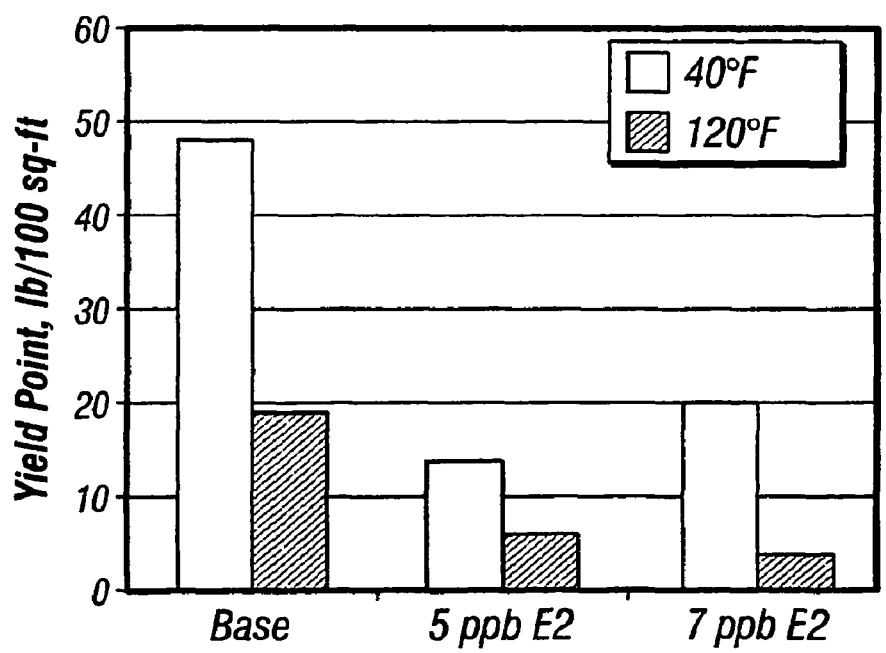
FIG. 14 is a graph comparing yield point of mud systems with and without thinners of the invention tested as reported in Table 15.
Figure 15:
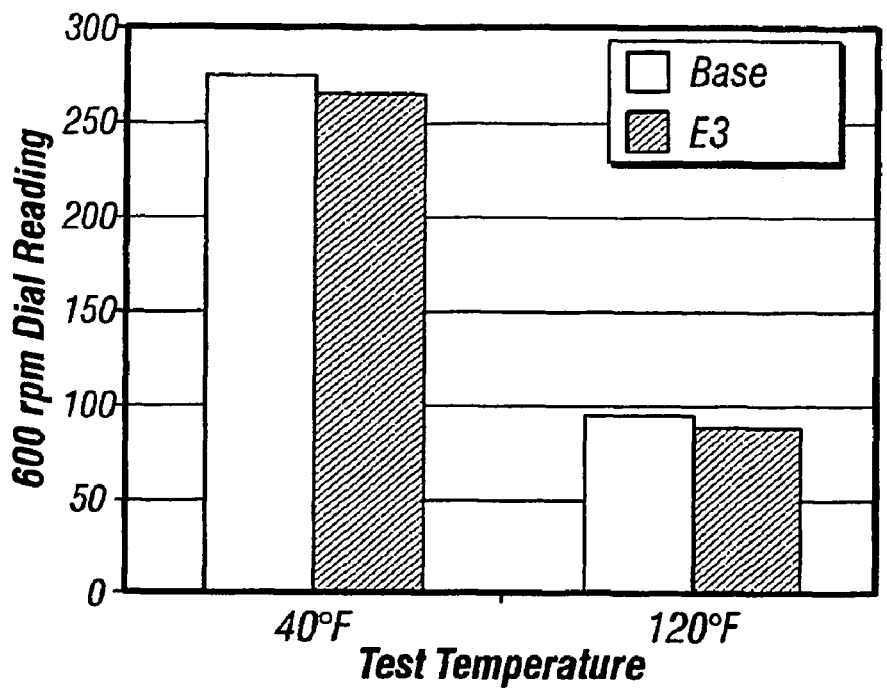
FIG. 15 is a graph comparing yield point of mud systems with and without thinners of the invention tested as reported in Table 16.
Figure 16:
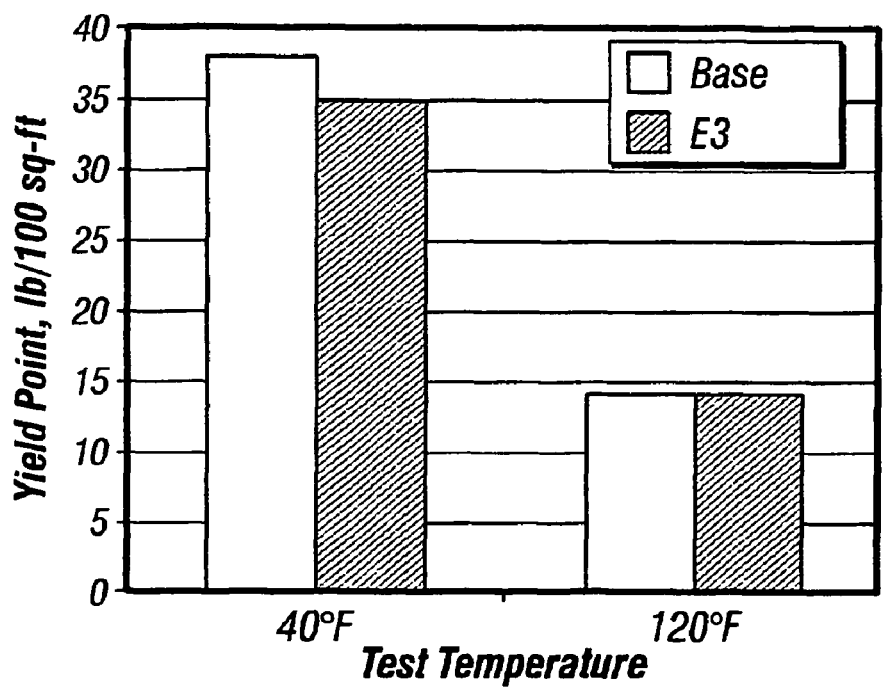
FIG. 16 is a graph comparing yield point of mud systems with and without thinners of the invention tested as reported in Table 17.

The present invention provides a method of influencing the rheology, and particularly reducing the viscosity, of invert (water-in-oil) emulsions and drilling fluids or well service fluids comprising such invert (water-in-oil) emulsions. The method is particularly applicable to fluids for use in wellbores penetrating hydrocarbon bearing subterranean formations. Such drilling fluids and well service fluids typically comprise a continuous oil phase, water dispersed in the oil phase, solids insoluble in the drilling fluid or well service fluid suspended in the fluid, and various additives. As the term is used herein, an "invert emulsion" or an "oil-in-water emulsion" is understood to mean the liquid portion of a drilling fluid comprising an emulsion (excluding any solids). The term "invert emulsion drilling fluid" means the total sum of what is circulated as a drilling fluid.

In the method of this invention, certain non-ionic surfactants are added to the invert emulsion or oil based drilling fluid (or well service fluid) to "thin" or reduce the viscosity of the fluid or to enhance the ability of the fluid to maintain its viscosity or to resist increasing viscosity over a broad range of temperatures. The particular non-ionic surfactants are reaction products of ethylene oxide, propylene oxide and/or butylene oxide with $C_{10-22}$ carboxylic acids or $C_{10-22}$ carboxylic acid derivatives containing at least one double bond in position 9, 10, 13, or 14 (and preferably one or two double bonds in position 9/10 and/or 13/14) having structural units of the general formula (I)

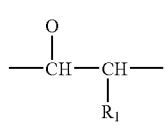

(I)

where $R_1$ is a hydrogen atom, or an OH group, or a group $OR_2$. $R_2$ is an alkyl group of about 1 to about 18 carbon atoms, or an alkenyl group of about 2 to about 18 carbon atoms, or a group of the formula (II)

(II)

$R_3$ is a hydrogen atom, or an alkyl group of about 1 to about 21 carbon atoms, or an alkylene group of about 2 to about 21 carbon atoms.

The alkoxylation products may be prepared in accordance with the teaching of DE 39 23 394, which is incorporated herein by reference, by reacting the OH-containing carboxylic acid derivatives, for example, with ethylene oxide, propylene oxide and/or butylene oxide in the presence of an appropriate catalyst at temperatures between about 110 and about 200° C. and pressures between about $10^5$ Pa and about $2 \times 10^6$ Pa.

Suitable starting materials for OH-containing $C_{10-22}$ carboxylic acids or $C_{10-22}$ carboxylic acid derivatives are unsaturated, naturally occurring and/or synthesizable $C_{10-22}$ carboxylic acids or derivatives thereof containing carboxylic acid radicals having at least one or two double bonds in position 9, 10, 13 and/or 14. Examples of such unsaturated carboxylic acid derivatives are 9-dodecenoic acid, 9-tetradecenoic acid, 9-hexadecenoic acid, 9-octadecenoic acid, 9-octadecenoic acid, 9,12-octadecadienoic acid, 9,12,15-octadecatrienoic acid, 9-icosenoic acid, 13-docosenoic acid, and mixtures containing a large amount (i.e., preferably at least about 60%) of such unsaturated carboxylic acids. As starting materials it is preferable to use carboxylic acids having about 16 to about 22 carbon atoms and at least one or two double bonds in position 9 and/or 13 or carboxylic acid mixtures containing at least a large amount (i.e., preferably at least about 80%) of carboxylic acids having about 16 to about 22 carbon atoms and at least one or two double bonds in position 9 and/or 13.

Further examples of suitable unsaturated carboxylic acid derivatives for use in preparing thinner compounds for use in the invention are unsaturated $C_{10-22}$ carboxylic esters, such as for example, unsaturated $C_{10-22}$ carboxylic acid alkyl esters with monohydric alcohols having about 1 to about 18 carbon atoms. Particularly appropriate are $C_{10-22}$ carboxylic mono-, di- and/or triglycerides containing unsaturated $C_{10-22}$ carboxylic acid radicals having at least one or two double bonds in position 9 and/or 13. Also suitable are esters of $C_{10-22}$ carboxylic acids with other polyols, such as for example ethylene glycol or trimethylolpropane.

Unsaturated $C_{10-22}$ carboxylic acid $C_{1-18}$ alkyl esters are obtainable by esterifying the corresponding unsaturated carboxylic acid or by transesterifying the corresponding mono-, di- and/or triglycerides with $C_{1-18}$ alkyl alcohols, such as, for example, methanol, ethanol, propanol, butanol, isobutanol, 2-ethylhexanol, decanol and/or stearyl alcohol. Examples of such unsaturated $C_{10-22}$ carboxylic acid $C_{1-18}$ alkyl esters are methyl palmitate, methyl oleate, ethyl oleate, isobutyl oleate, 2-ethylhexyl oleate and/or dodecyl oleate and/or $C_{10}$ carboxylic acid $C_{1-18}$ alkyl ester mixtures containing at least a large fraction (i.e., at least about 60%) of those $C_{10-22}$ carboyxlic acid $C_{1-18}$ alkyl esters whose carboxylic acid radicals have at least one or two double bonds in position 9 and/or 13, such as, for example, palm oil methyl ester, soya oil methyl ester, colza oil methyl ester and/or tallow fatty acid ethyl ester. Other suitable starting materials for preparing the alkoxylation products for use in the invention are fats and oils of natural origin whose carboxylic acid content is comprised predominantly of unsaturated $C_{10-22}$ carboxylic acids having at least one or two double bonds in position 9 and/or 13, such as, for example, olive oil, linseed oil, sunflower oil, soya oil, groundnut oil, cottonseed oil, colza oil, palm oil, lard and tallow.

Unsaturated $C_{10-22}$ carboxylic acids and/or $C_{10-22}$ carboxylic acid derivatives may be epoxidized to the OH-containing compounds, for example, by reaction with peracetic acid in the presence of acidic catalysts or with performic acid formed in situ from formic acid and hydrogen peroxide. The oxirane rings of the epoxidized carboxylic acids and/or carboxylic acid derivatives are subsequently cleaved open to form hydroxyl groups by reaction with hydrogen or protic compounds, such as water, straight-chain and/or branched-chain alkyl and/or alkenyl alcohols having about 1 to about 18 carbon atoms or straight-chain and/or branched-chain, saturated and/or unsaturated $C_{1-18}$ carboxylic acids. Other natural or synthetic compounds comprising epoxide-containing carboxylic acids or carboxylic acid derivatives, such as castor oil or hydrogenated castor oil, may also be used. The cleavage conditions are chosen such that the acid-derivative groups and acid groups present remain intact.

The reaction of epoxidized carboxylic acid derivatives and/or epoxidized carboxylic acids with protic compounds may be carried out, for example, in accordance with the processes described in DE 39 23 394.

The carboxylic acids and/or carboxylic acid derivatives obtained by cleaving the oxirane rings, containing carboxylic acid radicals having at least one OH group in position 9, 10, 13 and/or 14, are subsequently reacted by known industrial processes with ethylene oxide, propylene oxide and/or butylene oxide (preferably with ethylene oxide and/or propylene oxide).

Alkoxylation products obtained by alkoxylating compounds of the formula (I) in which $R_1$ is a group $OR_2$ and $R_2$ is a radical of the formula (II) are preferred. Compounds where the radical $R_3$ is an alkyl group of about 8 to about 16 carbon atoms, most preferably about 8 to about 10 carbon atoms, are also preferred.

Some non-ionic surfactant compounds that could possibly be used as thinners in accordance with the present invention are also described in WO98/19043 of Henkel Kommandiegesellschaft auf Aktien. That international application teaches use of the compounds in the oil and gas industry as cleaning agents, in contrast to the use of the present invention.

Used as thinners according to the method of the invention, the non-ionic surfactants of the present invention reduce the viscosity or lower the yield point of the drilling fluid to which they are added over a broad range of temperatures.

Example drilling fluids comprising invert (water-in-oil) emulsions of particular use in the method of the invention generally have an oil phase comprising diesel oil, paraffin oil and/or mineral oil, or a synthetic oil. Alternatively, other carrier fluids may be used such as carboxylic esters, alcohols, ethers, internal olefins, alphaolefins (IO and/or AO), and polyalphaolefins (PAO), which may be branched or unbranched but are preferably linear and preferably ecologically acceptable (non-polluting oils). Preferably, the oils or carrier fluids used for the oil phase of the drilling fluid will be comprised of compounds which are flowable and pumpable at temperatures above about 32° F. (about 0° C.) or as low as about 40° F. (about 5° C.) as well as at higher temperatures. For example, compounds selected from one or more of the following groups or classes below are believed particularly suitable to comprise the oil phase of drilling fluids used in the present invention:

(a) most preferably, carboxylic esters of the formula:

where R' is a saturated or unsaturated, linear or branched, alkyl radical having about 1 to about 23 carbon atoms and R" is an alkyl radical, branched or unbranched, saturated or unsaturated, having about 1 to about 23 carbon atoms;

(b) also preferably, linear or branched olefins having about 8 to about 30 carbon atoms;

(c) water-insoluble symmetric or asymmetric ethers of monohydric alcohols of natural or synthetic origin, said alcohols containing about 1 to about 24 carbon atoms;

(d) water-insoluble alcohols of the formula:

where R'" is a saturated, unsaturated, linear or branched, alkyl radical having about 8 to about 24 carbon atoms; and (e) carbonic diesters.

Such suitable oils are taught further, for example, in: European Patent Applications 0 374 671, 0 374,672, 0 382 070, and 0 386 638 of Cognis; European Laid-Open Specification 0 765 368 of Cognis (linear olefins); European Application 0 472 557 (water insoluble symmetric or asymmetric ethers of monohydric alcohols of natural or synthetic origin containing about 1 to about 24 carbon atoms); European Application 0 532 570 (carbonic diesters). Carboxylic esters of formula (III) above are preferred for the oil phase of drilling fluids used in this invention and particularly preferred are the esters described in European Laid-Open Specification EP 0 374 672 and EP 0 386 636.

In a preferred embodiment of this invention, non-ionic surfactants of the invention are added to drilling fluids comprising invert emulsions having an oil phase comprising esters of formula (III) where the radical R' in formula (III) is an alkyl radical having about 5 to about 21 carbon atoms (or more preferably about 5 to about 17 carbon atoms or most preferably about 11 to about 17 carbon atoms). Particularly suitable alcohols for making such esters are branched or unbranched alcohols with about 1 to about 8 carbon atoms, for example, methanol, isopropanol, isobutanol, and 2-ethylhexanol. Alcohols having about 12 to about 18 carbon atoms may alternatively be preferred for making other esters suitable for the invention.

For example, additional preferred esters for the oil phase of drilling fluids used in the invention include, without limitation: saturated C12-C14 fatty acid esters and unsaturated C16-C18 fatty acids (with isopropyl-, isobutyl- or 2-ethylhexanol as the alcohol component); 2-ethylhexyl octanoate; acetic acid esters, especially acetates of C8-C18 fatty alcohols; branched carboxylic esters disclosed in WO 99/33932 of Chevron or EP 0 642 561 of Exxon; alpha olefin mixtures disclosed in EP 0 765 368 A1 of Cognis and Halliburton; and blends of these various esters.

The oil phase of the emulsions of the drilling fluids used in the invention is preferably comprised of at least about 50% by volume of one or more preferred compounds (a)-(e) above. More preferably, such preferred compounds comprise about 60% to about 80% by volume of said oil phase, and most preferably, such preferred compounds comprise about 100% of the oil phase.

Water is preferably present in the liquid phase of the emulsions of the drilling fluids used in the invention in amounts preferably not less than about 0.5% by volume (excluding solids in the liquid phase). In a preferred embodiment of this invention, the nonionic surfactant thinners of the present invention are added to drilling fluids (preferably comprising invert emulsions) containing about 15% to about 35% by volume water and more preferably about 20% by volume water and about 80% by volume oil phase.

To compensate for the osmotic gradient between the drilling mud and the formation or connate water, water in drilling fluids used in the present invention typically includes fractions of electrolytes, such as calcium salts and/or sodium salts. $CaCl_2$ in particular is frequently used, although other salts from the group of alkali metals and/or alkaline earth metals are also suitable, with potassium acetates and formates being common examples.

Preferred drilling fluids used in this invention have the following rheology: plastic viscosity (PV) preferably in the range of about 10 to about 60 cP, and more preferably in the range of about 15 to about 40 cP, and yield point (YP) preferably in the range of about 5 to about 40 lb/100 ft$^2$, and more preferably in the range of about 10 to about 25 lb/100 ft$^2$, when measured at about 122° F. (about 50° C.). At lower temperatures, i.e., at or below about 40° F. (about 4° C.), the YP should not exceed about 75 lb/100 ft$^2$, and should preferably be in the range of about 10 to about 65 lb/100 ft$^2$, more preferably about 15 to about 45 lb/100 ft$^2$, and most preferably less than about 35 lb/100 ft$^2$. A preferred practicable lower limit for YP for drilling fluids used in this invention is about 5 lb/100 ft$^2$.

Methods for determining these parameters of PV and YP are well known to those skilled in the art. An example reference is "Manual of Drilling Fluids Technology", particularly the chapter on Mud Testing, available from Baroid Drilling Fluids, Inc., in Houston, Tex. (USA) and Aberdeen, Scotland, incorporated herein by reference.

The solids content (not including low gravity solids), or amount of weighting agents, in drilling fluids used in this invention is preferably about 0 to about 500 lb/bbl, and most preferably about 150 to about 350 lb/bbl. The mud weight, i.e., the density of the drilling fluids, is preferably in the range of about 8 to about 18 lb/gal. and more preferably about 9 to about 15 lb/gal. Such solids, or weighting agents, which serve to increase density of the drilling fluids, may be any solids known to those skilled in the art as useful for such purpose, but will preferably be inert or environmentally friendly. Barite and barium sulfate are examples of commonly used weighting agents.

Drilling fluids used in this invention may optionally also contain other additives known to those skilled in the art, such as fluid-loss control additives and emulsifiers. Alkali may also be used, preferably lime (calcium hydroxide or calcium oxide), to bind or react with acidic gases (such as $CO_2$ and $H_2S$) encountered during drilling in the formation. Such alkali, or an alkali reserve, is known to prevent hydrolysis by acidic gases of generally acid-labile esters of the drilling fluid. Preferred quantities of free lime in the drilling fluids may range from about 1 to about 10 lbs/bbl, and more preferably about 1 to about 4 lbs/bbl, although lower ranges such as less than about 2 lbs/bbl are preferred for certain esters that tend to hydrolyze in the presence of alkaline compounds as will be known to those skilled in the art. Other suitable agents as an alternative to lime may also be used to adjust and/or stabilize invert emulsions of the drilling fluids with respect to acids. An example of such alternative agents is a protonated amine, as described in U.S. Pat. No. 5,977,031.

Further optional additives that may be present in the drilling fluids used in this invention include electrolytes, such as calcium chloride, organophilic bentonite and organophilic lignite. Glycols and/or glycerol may also be added. Still further, dispersion aids, corrosion inhibitors and/or defoamers may be used. These and other suitable auxiliaries and additives are used in amounts known to those skilled in the art depending on the conditions of the particular wellbore and subterranean formation.

In an alternative embodiment of the present invention, in addition to the non-ionic surfactant thinners of the present invention described above, additional thinners may be added advantageously in combination with said non-ionic surfactant thinners. Such particularly advantageous co-thinners are alkoxylated compounds of the general formula (V):

$$R''''-(C_2H_4O)_n(C_3H_6O)_m(C_4H_8O)_k-H \qquad (V)$$

where R'''' is a saturated or unsaturated, linear or branched, alkyl radical having about 8 to about 24 carbon atoms, n is a number ranging from about 1 to about 10, m is a number ranging from about 0 to about 10, and k is a number ranging from about 0 to about 10. Preferably, R'''' has about 8 to about 18 carbon atoms; more preferably, R'''' has about 12 to about 18 carbon atoms; and most preferably, R'''' has about 12 to about 14 carbon atoms. Also, most preferably, R'''' is saturated and linear.

The compositions or compounds of formula (V) may be prepared by customary techniques of alkoxylation, such as alkoxylating the corresponding fatty alcohols with ethylene oxide and/or propylene oxide or butylene oxide under pressure and in the presence of acidic or alkaline catalysts as is known in the art. Such alkoxylation may take place blockwise, i.e., the fatty alcohol may be reacted first with ethylene oxide, propylene oxide or butylene oxide and subsequently, if desired, with one or more of the other alkylene oxides. Alternatively, such alkoxylation may be conducted randomly, in which any desired mixture of ethylene oxide, propylene oxide and/or butylene oxide is reacted with the fatty alcohol.

In formula (V), the subscripts n and m respectively represent the number of ethylene oxide (EO) and propylene oxide (PO) molecules or groups in one molecule of the alkoxylated fatty alcohol. The subscript k indicates the number of butylene oxide (BO) molecules or groups. The subscripts n, m, and k need not be integers, since they indicate in each case statistical averages of the alkoxylation. Included without limitation are those compounds of the formula (V) whose ethoxy, propoxy, and/or butoxy group distribution is very narrow, such as for example, "narrow range ethoxylates" also called "NREs" by those skilled in the art.

To accomplish the purposes of this invention, the compound of formula (V) must contain at least one ethoxy group and may have up to or about 10 ethoxy groups. Preferably, the compound of formula (V) will also contain at least one propoxy group ($C_3H_6O$—) or butoxy group ($C_4H_8O$—). Mixed alkoxides containing all three alkoxide groups—ethylene oxide, propylene oxide, and butylene oxide—are possible for the invention but are not preferred.

Preferably, for use according to this invention, the compound of formula (V) will have a value for m ranging from about 1 to about 10 with k zero or a value for k ranging from about 1 to about 10 with m zero. Most preferably, m will be about 1 to about 10 and k will be zero.

Other preferred compounds for use in the invention having the formula (V) above will have n ranging from about 1 to about 6, m ranging from about 1 to about 6, and k zero. Still other preferred compounds for use in the invention having the formula (V) above will have n ranging from about 2 to about 5, and m being about 3 or about 4 with k zero. It is particularly advantageous to establish the distribution of ethylene oxide and propylene oxide groups in the compounds of formula (V) in an ethylene oxide to propylene oxide ratio of about 1:1 to about 2:1, or even more preferably, about 2:1.5.

Additional preferred compounds for use in the invention having formula (V) above will have alkyl radicals containing about 12 to about 18 carbon atoms, or more preferably about 12 to about 14 carbon atoms, with subscripts n and m each having values of about 4 or about 5.

Both the non-ionic surfactant thinners of the present invention and the thinners of formula (V) may be added to the drilling fluid (or well service fluid) during initial preparation of the fluid or later as the fluid is being used for drilling or well service purposes in the formation. Alternatively, the non-ionic surfactant thinners may be added first at either of these times and the thinners of formula (V) may be added later. In still another embodiment, the thinners of formula (V) may be added first during either of these times and the non-ionic surfactant thinners of the invention may be added later.

The quantity of thinners added is an effective amount to maintain or effect the desired viscosity of the drilling fluid, preferably or particularly over a broad temperature range. For purposes of this invention, an "effective amount" of non-ionic surfactant thinner is preferably from about 0.5 to about 15 pounds per barrel of drilling fluid or mud. A more preferred amount of surfactant thinner ranges from about 1 to about 5 pounds per barrel of drilling fluid and a most preferred amount is about 1.5 to about 3 pounds thinner per barrel of drilling fluid. When the non-ionic surfactant thinners are used with formula (V) thinners, it is preferred to use the non-ionic surfactant thinners of the present invention and the thinners of formula (V) in proportions of from about 1:1 to about 10:1.

The thinners of the present invention are biodegradable and are of little or no toxicity. They are expected to be capable of meeting increasingly stringent environmental regulations affecting the oil and gas industry worldwide.

Although the invention has primarily been described in the context of a method of using non-ionic surfactants alone and in combination with the compounds of formula (V) as thinners for drilling fluids over a broad temperature range, these non-ionic surfactants alone and in combination with compounds of formula (V) may also be effective as thinners for well service fluids such as spotting fluids or workover fluids over a broad temperature range.

Further description and use of the invention is shown by the following examples:

EXAMPLES

To show the effect of the invention, the following experiments were conducted. In each case an invert emulsion drilling mud system of the following general composition was prepared:

| | | |
|---|---|---|
| Ester | Bbl | 0.496 |
| Water | bbl | 0.233 |
| Emulsifier | lb | 6.0 |
| Organophilic bentonite | lb | 1.0 |
| Organophilic lignite | lb | 5.0 |
| Alkali reserve (lime) | lb | 1.5 |
| $CaCl_2 \times 2\,H_2O$ | lb | 27.2 |
| Barite | lb | 314.0 |
| Rev. dust | lb | 45.5 |
| Dispersing auxiliary | lb | 0.5 |
| Thinner | lb/bbl | 3.0 |

The oil phase (A) used was a 2-ethylhexyl octanoate as disclosed in EP 0 386 636. The emulsifier used was the product EZ MUL NTE (Baroid Drilling Fluids Inc., Houston, Tex.). The oil/water ratio was 70/30 in each case. Measurements were carried out on a system without thinner (C1), and with four non-ionic surfactant thinners E1 to E4 of the invention.

| | |
|---|---|
| E1 | RS1100 ™, of Cognis, Germany, see below |
| E2 | like E1, but reacted with 39 parts of ethylene oxide |
| E3 | like E1, but reacted with no parts of ethylene oxide |
| E4 | like E3, but reacted with 25 parts of ethylene oxide |
| E5 | like E1, but reacted with 50 parts of ethylene oxide |

E1 was prepared according to the procedure described in U.S. Pat. No. 5,237,080 to Dante et al., assigned to Henkel Kommandiengesellschaft auf Aktien, by reacting fatty acids (60% $C_8$, 35% $C_{10}$, AN=361.9) with soya oil epoxide and distilling the product to obtain a clear yellow polyol (viscosity=5550 mPas; 20° C.; OHN=105, SN=236, AN=3.1). This reaction product was then admixed with potassium hydroxide in methanol and heated, after which all traces of methanol were removed. The product was then reacted with 61 parts of ethylene oxide at a pressure not exceeding 5 bar to yield, after neutralization, a clear yellow liquid (OHN=54.7). This product may be obtained from Cognis, Germany, under the tradename RS 1100.

The invert drilling fluids or muds were prepared in a conventional manner and subsequently, at 40° F. and 120° F., the rheological characteristics of plastic viscosity (PV) and yield point (YP) and the gel strength after 10 seconds and 10 minutes using a Fann SR12 rheometer (from Fann) were determined.

The results of the measurements are given in Table 1:

TABLE 1

|  | C1 | C1 | E1 | E1 | E2 | E2 | E3 | E3 | E4 | E4 | E5 | E5 |
|---|---|---|---|---|---|---|---|---|---|---|---|---|
| Temperature °F. | 40 | 120 | 40 | 120 | 40 | 120 | 40 | 120 | 40 | 120 | 40 | 20 |
| PV (cP) | 118 | 40 | 106 | 45 | 111 | 12 | 110 | 37 | 107 | 34 | 100 | 31 |
| YP lb/100 ft$^2$ | 38 | 14 | 32 | 10 | 26 | 35 | 53 | 20 | 21 | 7 | 15 | 4 |
| Gels 10"/10' | 16/22 | 6/11 | 7/8 | 3/5 | 13/22 | 5/8 | 20/30 | 8/4 | 9/14 | 4/5 | 6/10 | 3/5 |

The data, especially for the yield point (YP), clearly indicate the advantageous thinning effect of the non-ionic surfactant thinners used according to the invention.

Further experiments may be seen in Tables 2 to 17. In these cases, the yield point (YP) of the systems tested was investigated at different temperatures and depicted as a graph. The measurements were carried out using a Fann 35 viscometer (from Fann). The tables also indicate the dial readings at different speeds of rotation per minute (rpm).

In Tables 2 to 17:
- PETROFREE LV® is 2-ethylhexyl octanoate (Cognis, Germany)
- PETROFREE® is C8-14 fatty acid 2-ethylhexyl ester (Cognis)
- GELTONE II® is organophilic bentonite (Baroid, Houston, Tex.)
- Thinner E1 is RS 1100™ (Cognis)
- E1, E2, E3, E4, and E5 are the same as indicated above and as in Table 1.

TABLE 2

| Mud system | PETROFREE | | | |
|---|---|---|---|---|
| Mud weight, lb/gal | 9.5 | | | |
| Oil/water ratio | 70/30 | | | |
| E1, lb/bbl | 0 | | 1 | |
| Temperature, °F. | 40 | 120 | 40 | 120 |
| Plastic viscosity, cP | 75 | 26 | 78 | 23 |
| Yield point, lb/100 ft$^2$ | 62 | 31 | 29 | 15 |
| 10 sec gel, lb/100 ft$^2$ | 26 | 16 | 23 | 8 |
| 10 min gel, lb/100 ft$^2$ | 27 | 17 | 23 | 10 |
| Fann 35 dial readings | | | | |
| 600 rpm | 212 | 83 | 185 | 61 |
| 300 rpm | 137 | 57 | 107 | 38 |
| 200 rpm | 110 | 47 | 79 | 30 |
| 100 rpm | 77 | 36 | 49 | 20 |
| 6 rpm | 30 | 18 | 14 | 9 |
| 3 rpm | 26 | 16 | 11 | 7 |

TABLE 3

| Mud system | PETROFREE | | | |
|---|---|---|---|---|
| Mud weight, lb/gal | 14.0 | | | |
| Oil/water ratio | 75/25 | | | |
| Contaminant | Excess GELTONE II | | | |
| E1 | 0 | | 3 | |
| Temperature, °F. | 40 | 120 | 40 | 120 |
| Plastic viscosity, cP | 180 | 51 | 140 | 36 |
| Yield point, lb/100 ft$^2$ | 230 | 152 | 19 | 8 |
| 10 sec gel, lb/100 ft$^2$ | 108 | 64 | 7 | 3 |
| 10 min gel, lb/100 ft$^2$ | 110 | 66 | 13 | 4 |
| Fann 35 dial readings | | | | |
| 600 rpm | 590 | 254 | 299 | 80 |
| 300 rpm | 410 | 203 | 159 | 44 |
| 200 rpm | 336 | 179 | 110 | 30 |
| 100 rpm | 248 | 146 | 62 | 18 |
| 6 rpm | 112 | 79 | 8 | 3 |
| 3 rpm | 100 | 70 | 6 | 2 |

TABLE 4

| Mud system | PETROFREE | | | |
|---|---|---|---|---|
| Mud weight, lb/gal | 11.0 | | | |
| Oil/water ratio | 70/30 | | | |
| Contaminant | Drill solids | | | |
| E1, lb/bbl | 0 | | 3 | |
| Temperature, °F. | 40 | 120 | 40 | 120 |
| Plastic viscosity, cP | 11 | 34 | 108 | 35 |
| Yield point, lb/100 ft$^2$ | 90 | 47 | 27 | 7 |
| 10 sec gel, lb/100 ft$^2$ | 38 | 21 | 4 | 3 |
| 10 min gel, lb/100 ft$^2$ | 44 | 24 | 7 | 5 |
| Fann 35 dial readings | | | | |
| 600 rpm | 300 | 115 | 243 | 77 |
| 300 rpm | 200 | 81 | 135 | 42 |
| 200 rpm | 157 | 67 | 95 | 30 |
| 100 rpm | 110 | 50 | 52 | 17 |
| 6 rpm | 42 | 23 | 7 | 3 |
| 3 rpm | 38 | 21 | 5 | 2 |

TABLE 5

| Mud system | PETROFREE | | | |
|---|---|---|---|---|
| Mud weight, lb/gal | 11.0 | | | |
| Oil/water ratio | 70/30 | | | |
| Contaminant | Excess GELTONE II | | | |
| E1, lb/bbl | 0 | | 3 | |
| Temperature, °F. | 40 | 120 | 40 | 120 |
| Plastic viscosity, cP | 132 | 31 | 62 | 18 |
| Yield point, lb/100 ft$^2$ | 54 | 53 | 11 | 3 |
| 10 sec gel, lb/100 ft$^2$ | 33 | 23 | 3 | 2 |
| 10 min gel, lb/100 ft$^2$ | 38 | 27 | 5 | 3 |
| Fann 35 dial readings | | | | |
| 600 rpm | 318 | 115 | 135 | 39 |
| 300 rpm | 186 | 84 | 73 | 21 |
| 200 rpm | 139 | 71 | 52 | 14 |
| 100 rpm | 91 | 54 | 29 | 9 |
| 6 rpm | 35 | 25 | 4 | 2 |
| 3 rpm | 32 | 21 | 3 | 1 |

TABLE 6

| Mud system | PETROFREE LV | | | |
|---|---|---|---|---|
| Mud weight, lb/gal | 14.0 | | | |
| Oil/water ratio | 70/30 | | | |
| Contaminant | Drill solids | | | |
| E1, lb/bbl | 0 | | 3 | |
| Temperature, °F. | 40 | 120 | 40 | 120 |
| Plastic viscosity, cP | 118 | 40 | 106 | 45 |
| Yield point, lb/100 ft$^2$ | 38 | 14 | 32 | 10 |

TABLE 6-continued

| | | | | |
|---|---|---|---|---|
| 10 sec gel, lb/100 ft$^2$ | 16 | 6 | 7 | 3 |
| 10 min gel, lb/100 ft$^2$ | 22 | 11 | 8 | 5 |
| Fann 35 dial readings | | | | |
| 600 rpm | 274 | 94 | 244 | 100 |
| 300 rpm | 156 | 54 | 138 | 55 |
| 200 rpm | 114 | 40 | 98 | 39 |
| 100 rpm | 70 | 25 | 55 | 22 |
| 6 rpm | 17 | 6 | 8 | 4 |
| 3 rpm | 14 | 5 | 5 | 3 |

TABLE 7

| | | | | |
|---|---|---|---|---|
| Mud system | \multicolumn{4}{c}{PETROFREE LV} | | | |
| Mud weight, lb/gal | \multicolumn{4}{c}{14.0} | | | |
| Oil/water ratio | \multicolumn{4}{c}{70/30} | | | |
| Contaminant | \multicolumn{4}{c}{Drill solids} | | | |
| E1, lb/bbl | 0 | | 3 | |
| Temperature, °F. | 40 | 120 | 40 | 120 |
| Plastic viscosity, cP | 110 | 37 | 100 | 31 |
| Yield point, lb/100 ft$^2$ | 53 | 20 | 15 | 4 |
| 10 sec gel, lb/100 ft$^2$ | 20 | 8 | 6 | 3 |
| 10 min gel, lb/100 ft$^2$ | 30 | 14 | 10 | 5 |
| Fann 35 dial readings | | | | |
| 600 rpm | 273 | 94 | 215 | 66 |
| 300 rpm | 163 | 57 | 115 | 35 |
| 200 rpm | 124 | 42 | 80 | 25 |
| 100 rpm | 80 | 27 | 44 | 15 |
| 6 rpm | 23 | 8 | 7 | 3 |
| 3 rpm | 19 | 7 | 5 | 2 |

TABLE 8

| | | |
|---|---|---|
| Mud system | \multicolumn{2}{c}{PETROFREE} | |
| Mud weight, lb/gal | \multicolumn{2}{c}{9.5} | |
| Oil/water ratio | \multicolumn{2}{c}{70/30} | |
| E5, lb/bbl | 0 | 3 |
| Temperature, °F. | 120 | 120 |
| Plastic viscosity, cP | 22 | 21 |
| Yield point, lb/100 ft$^2$ | 39 | 16 |
| 10 sec gel, lb/100 ft$^2$ | 16 | 8 |
| 10 min gel, lb/100 ft$^2$ | 17 | 10 |
| Fann 35 dial readings | | |
| 600 rpm | 83 | 58 |
| 300 rpm | 61 | 37 |
| 200 rpm | 52 | 28 |
| 100 rpm | 40 | 20 |
| 6 rpm | 19 | 8 |
| 3 rpm | 17 | 7 |

TABLE 9

| | | | | |
|---|---|---|---|---|
| Mud system | \multicolumn{4}{c}{PETROFREE LV} | | | |
| Mud weight, lb/gal | \multicolumn{4}{c}{9.5} | | | |
| Oil/water ratio | \multicolumn{4}{c}{70/30} | | | |
| Contaminant | \multicolumn{4}{c}{Drill solids} | | | |
| E1, lb/bbl | 0 | | 3 | |
| Temperature, °F. | 40 | 120 | 40 | 120 |
| Plastic viscosity, cP | 65 | 20 | 52 | 20 |
| Yield point, lb/100 ft$^2$ | 31 | 33 | 27 | 17 |
| 10 sec gel, lb/100 ft$^2$ | 29 | 17 | 17 | 10 |
| 10 min gel, lb/100 ft$^2$ | 32 | 22 | 26 | 15 |
| Fann 35 dial readings | | | | |
| 600 rpm | 151 | 73 | 131 | 57 |
| 300 rpm | 96 | 53 | 79 | 37 |
| 200 rpm | 78 | 44 | 66 | 30 |
| 100 rpm | 57 | 34 | 29 | 20 |
| 6 rpm | 29 | 18 | 14 | 9 |
| 3 rpm | 27 | 16 | 12 | 8 |

TABLE 10

| | | | | |
|---|---|---|---|---|
| Mud system | \multicolumn{4}{c}{PETROFREE} | | | |
| Mud weight, lb/gal | \multicolumn{4}{c}{14.0} | | | |
| Oil/water ratio | \multicolumn{4}{c}{75/25} | | | |
| Contaminant | \multicolumn{4}{c}{Excess GELTONE II} | | | |
| E5, lb/bbl | 0 | | 3 | |
| Temperature, °F. | 40 | 120 | 40 | 120 |
| Plastic viscosity, cP | 180 | 51 | 175 | 47 |
| Yield point, lb/100 ft$^2$ | 230 | 152 | 34 | 10 |
| 10 sec gel, lb/100 ft$^2$ | 108 | 64 | 10 | 3 |
| 10 min gel, lb/100 ft$^2$ | 110 | 66 | 14 | 5 |
| Fann 35 dial readings | | | | |
| 600 rpm | 590 | 254 | 384 | 104 |
| 300 rpm | 410 | 203 | 209 | 57 |
| 200 rpm | 336 | 179 | 148 | 40 |
| 100 rpm | 248 | 146 | 82 | 23 |
| 6 rpm | 112 | 79 | 12 | 3 |
| 3 rpm | 100 | 70 | 9 | 2 |

TABLE 11

| | | | | |
|---|---|---|---|---|
| Mud system | \multicolumn{4}{c}{PETROFREE} | | | |
| Mud weight, lb/gal | \multicolumn{4}{c}{11.0} | | | |
| Oil/water ratio | \multicolumn{4}{c}{70/30} | | | |
| Contaminant | \multicolumn{4}{c}{Drill solids} | | | |
| E5, lb/bbl | 0 | | 3 | |
| Temperature, °F. | 40 | 120 | 40 | 120 |
| Plastic viscosity, cP | 110 | 34 | 106 | 30 |
| Yield point, lb/100 ft$^2$ | 90 | 47 | 20 | 9 |
| 10 sec gel, lb/100 ft$^2$ | 38 | 21 | 8 | 5 |
| 10 min gel, lb/100 ft$^2$ | 44 | 24 | 11 | 9 |
| Fann 35 dial readings | | | | |
| 600 rpm | 310 | 115 | 232 | 69 |
| 300 rpm | 200 | 81 | 126 | 39 |
| 200 rpm | 157 | 67 | 88 | 28 |
| 100 rpm | 110 | 50 | 49 | 17 |
| 6 rpm | 42 | 23 | 9 | 5 |
| 3 rpm | 38 | 21 | 7 | 4 |

TABLE 12

| | | | | |
|---|---|---|---|---|
| Mud system | \multicolumn{4}{c}{PETROFREE} | | | |
| Mud weight, lb/gal | \multicolumn{4}{c}{11.0} | | | |
| Oil/water ratio | \multicolumn{4}{c}{70/30} | | | |
| Contaminant | \multicolumn{4}{c}{Excess GELTONE II} | | | |
| E5, lb/bbl | 0 | | 3 | |
| Temperature, °F. | 40 | 120 | 40 | 120 |
| Plastic viscosity, cP | 132 | 31 | 90 | 23 |
| Yield point, lb/100 ft$^2$ | 54 | 53 | 20 | 9 |
| 10 sec gel, lb/100 ft$^2$ | 33 | 23 | 6 | 2 |
| 10 min gel, lb/100 ft$^2$ | 38 | 27 | 9 | 3 |
| Fann 35 dial readings | | | | |
| 600 rpm | 318 | 115 | 200 | 55 |
| 300 rpm | 186 | 84 | 110 | 32 |
| 200 rpm | 139 | 71 | 77 | 22 |
| 100 rpm | 91 | 54 | 42 | 13 |
| 6 rpm | 35 | 25 | 6 | 2 |
| 3 rpm | 32 | 21 | 4 | 1 |

TABLE 13

| | | | | |
|---|---|---|---|---|
| Mud system | \multicolumn{4}{c}{PETROFREE LV} | | | |
| Mud weight, lb/gal | \multicolumn{4}{c}{14.0} | | | |
| Oil/water ratio | \multicolumn{4}{c}{70/30} | | | |
| Contaminant | \multicolumn{4}{c}{Drill Solids} | | | |
| E1, lb/bbl | 0 | | 1 | |
| E2, lb/bbl | 0 | | 2 | |
| Temperature, °F. | 40 | 120 | 40 | 120 |
| Plastic viscosity, cP | 118 | 40 | 105 | 33 |
| Yield point, lb/100 ft$^2$ | 38 | 14 | 15 | 6 |

TABLE 13-continued

| | | | | |
|---|---|---|---|---|
| 10 sec gel, lb/100 ft² | 16 | 6 | 7 | 3 |
| 10 min gel, lb/100 ft² | 22 | 11 | 12 | 6 |
| Fann 35 dial readings | | | | |
| 600 rpm | 274 | 94 | 225 | 72 |
| 300 rpm | 156 | 54 | 120 | 39 |
| 200 rpm | 114 | 40 | 83 | 28 |
| 100 rpm | 70 | 25 | 45 | 16 |
| 6 rpm | 17 | 6 | 7 | 3 |
| 3 rpm | 14 | 5 | 5 | 2 |

TABLE 14

| Mud system | PETROFREE LV | | | | | |
|---|---|---|---|---|---|---|
| Mud weight, lb/gal | 14.0 | | | | | |
| Oil/water ratio | 70/30 | | | | | |
| Contaminant | Drill solids (5%) | | | | | |
| E2, lb/bbl | 0 | | 3 | | 5 | |
| Temperature, °F. | 40 | 120 | 40 | 120 | 40 | 120 |
| Plastic viscosity, cP | 118 | 40 | 111 | 35 | 114 | 37 |
| Yield point, lb/100 ft² | 38 | 14 | 26 | 7 | 17 | 2 |
| 10 sec gel, lb/100 ft² | 16 | 6 | 13 | 5 | 6 | 2 |
| 10 min gel, lb/100 ft² | 22 | 11 | 22 | 8 | 9 | 4 |
| Fann 35 dial readings | | | | | | |
| 600 rpm | 274 | 94 | 248 | 77 | 245 | 76 |
| 300 rpm | 156 | 54 | 137 | 42 | 131 | 39 |
| 200 rpm | 114 | 40 | 98 | 30 | 91 | 27 |
| 100 rpm | 70 | 25 | 57 | 18 | 50 | 16 |
| 6 rpm | 17 | 6 | 12 | 4 | 6 | 2 |
| 3 rpm | 14 | 5 | 10 | 3 | 4 | 1 |

TABLE 15

| Mud system | PETROFREE LV | | | | | |
|---|---|---|---|---|---|---|
| Mud weight, lb/gal | 14.0 | | | | | |
| Oil/water ratio | 70/30 | | | | | |
| Contaminant | Drill solids (10%) | | | | | |
| E2, lb/bbl | 0 | | 5 | | 7 | |
| Temperature, °F. | 40 | 120 | 40 | 120 | 40 | 120 |
| Plastic viscosity, cP | 176 | 59 | 152 | 48 | 150 | 47 |
| Yield point, lb/100 ft² | 48 | 19 | 14 | 6 | 20 | 4 |
| 10 sec gel, lb/100 ft² | 16 | 9 | 8 | 6 | 8 | 3 |
| 10 min gel, lb/100 ft² | 28 | 17 | 13 | 8 | 10 | 4 |
| Fann 35 dial readings | | | | | | |
| 600 rpm | 400 | 137 | 318 | 104 | 320 | 98 |
| 300 rpm | 224 | 78 | 166 | 56 | 170 | 51 |
| 200 rpm | 170 | 57 | 115 | 40 | 118 | 36 |
| 100 rpm | 100 | 34 | 62 | 23 | 64 | 20 |
| 6 rpm | 18 | 8 | 8 | 4 | 8 | 3 |
| 3 rpm | 14 | 7 | 7 | 3 | 6 | 2 |

TABLE 16

| Mud system | PETROFREE LV | | | |
|---|---|---|---|---|
| Mud weight, lb/gal | 14.0 | | | |
| Oil/water ratio | 70/30 | | | |
| Contaminant | Drill Solids | | | |
| E3, lb/bbl | 0 | | 3 | |
| Temperature, °F. | 40 | 120 | 40 | 120 |
| Plastic viscosity, cP | 118 | 40 | 115 | 36 |
| Yield point, lb/100 ft² | 38 | 14 | 35 | 14 |
| 10 sec gel, lb/100 ft² | 16 | 6 | 25 | 6 |
| 10 min gel, lb/100 ft² | 22 | 11 | 30 | 9 |
| Fann 35 dial readings | | | | |
| 600 rpm | 274 | 94 | 265 | 86 |
| 300 rpm | 156 | 54 | 150 | 50 |

TABLE 16-continued

| | | | | |
|---|---|---|---|---|
| 200 rpm | 114 | 40 | 110 | 37 |
| 100 rpm | 70 | 25 | 65 | 23 |
| 6 rpm | 17 | 6 | 17 | 5 |
| 3 rpm | 14 | 5 | 13 | 4 |

TABLE 17

| Mud system | PETROFREE LV | | | |
|---|---|---|---|---|
| Mud weight, lb/gal | 14.0 | | | |
| Oil/water ratio | 70/30 | | | |
| Contaminant | Drill Solids | | | |
| E3, lb/bbl | 0 | | 3 | |
| Temperature, °F. | 40 | 120 | 40 | 120 |
| Plastic viscosity, cP | 118 | 40 | 115 | 36 |
| Yield point, lb/100 ft² | 38 | 14 | 35 | 14 |
| 10 sec gel, lb/100 ft² | 16 | 6 | 25 | 6 |
| 10 min gel, lb/100 ft² | 22 | 11 | 30 | 9 |
| Fann 35 dial readings | | | | |
| 600 rpm | 274 | 94 | 265 | 86 |
| 300 rpm | 156 | 54 | 150 | 50 |
| 200 rpm | 114 | 40 | 110 | 37 |
| 100 rpm | 70 | 25 | 65 | 23 |
| 6 rpm | 17 | 6 | 17 | 5 |
| 3 rpm | 14 | 5 | 13 | 4 |

The foregoing description of the invention is intended to be a description of preferred embodiments. Various changes in the details of the described compositions and method can be made without departing from the intended scope of this invention as defined by the appended claims.

What is claimed is:

1. A method of drilling a borehole in a subterranean formation at a temperature in the range of about 40° F. to about 250° F., comprising:

providing or using in the drilling an invert emulsion drilling fluid comprising a continuous oil phase and having a plastic viscosity in the range of about 10 cP to about 60 cP and a yield point in the range of about 5 lb/100 ft² to about 40 lb/100 ft² when measured at about 122° F. (50° C.) and a yield point in the range of about 5 lb/100 ft² to about 75 lb/100 ft² when measured at about 40° F. (4° C.); and adding to the drilling fluid before or during the drilling at least one non-ionic surfactant thinner, wherein the surfactant is the reaction product of at least one oxide, selected from the group consisting of ethylene oxide, propylene oxide and butylene oxide, with $C_{10-22}$ carboxylic acids or $C_{10-22}$ carboxylic acid derivatives containing at least one double bond in position 9, 10, 13, or 14 having structural units of the general formula (I):

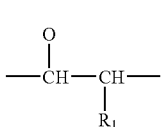

(I)

where $R_1$ is a hydrogen atom, or an OH group, or a group $OR_2$, and where $R_2$ is an alkyl group of about 1 to about 18 carbon atoms, or an alkenyl group of about 2 to about 18 carbon atoms, or a group of the formula (II):

(II)

and where $R_3$ is a hydrogen atom, or an alkyl group of about 1 to about 21 carbon atoms, or an alkylene group of about 2 to about 21 carbon atoms;

such that the drilling fluid maintains during the drilling a plastic viscosity in the range of about 10 cP to about 60 cP and a yield point in the range of about 5 lb/100 ft² to about 40 lb/100 ft² when measured at about 122° F. (50° C.) and a yield point in the range of about 5 lb/100 ft² to about 75 lb/100 ft² when measured at about 40° F. (4° C.).

2. The method of claim 1 wherein the surfactant thinner comprises alkylation products obtained by reacting $C_{12-22}$ carboxylic mono-, di- or triglycerides containing structural units of the formula (I) in at least one position 9, 10, 13, or 14 with at least one oxide of the group comprising ethylene oxide, propylene oxide, and butylene oxide.

3. The method of claim 1 wherein the surfactant thinner thins the drilling fluid so that the continuous oil phase of the fluid is flowable and pumpable at temperatures at least as low as about 40° F. (40° C.).

4. The method of claim 1 wherein the surfactant thinner thins the drilling fluid so that the continuous oil phase of the fluid is flowable and pumpable at temperatures at least as low as about 32° F. (0° C.).

5. The method of claim 1 wherein the continuous oil phase comprises compounds or compositions selected from the group consisting of:
(a) carboxylic esters of the formula: R'—COO—R" where R' is a saturated or unsaturated, linear or branched, alkyl radical having about 1 to about 23 carbon atoms and R" is an alkyl radical, branched or unbranched, saturated or unsaturated, having about 1 to about 23 carbon atoms;
(b) linear or branched olefins having about 8 to about 30 carbon atoms;
(c) water-insoluble symmetric or asymmetric ethers of monohydric alcohols of natural or synthetic origin, said alcohols containing about 1 to about 24 carbon atoms;
(d) water-insoluble alcohols of the formula: R'"—OH where R'" is a saturated, unsaturated, linear or branched alkyl radical having about 8 to about 24 carbon atoms; and
(e) carbonic diesters.

6. The method of claim 1 wherein the drilling fluid further comprises drilling fluid water dispersed in the oil phase and solids insoluble in the oil phase.

7. The method of claim 1 further comprising adding to the drilling fluid before or during the drilling a co-thinner compound having the formula:

R—(C₂H₄O)ₙ(C₃H₆O)ₘ(C₄H₈O)ₖ—H where R is a saturated or unsaturated, linear or branched alkyl radical having about 8 to about 24 carbon atoms, n is a number ranging from about 1 to about 10, m is a number ranging from about 0 to about 10, and k is a number ranging from about 0 to about 10.

8. The method of claim 7 wherein in the formula for the co-thinner compound, k is zero and m is a number ranging from about 1 to about 10, or m is zero and k is a number ranging from about 1 to about 10.

9. The method of claim 7 wherein in the formula for the co-thinner compound, n is a number ranging from about 1 to about 6, m is a number ranging from about 1 to about 6, and k is zero.

10. The method of claim 7 wherein the surfactant thinner and the co-thinner compound are added to the drilling fluid in proportions ranging from about 1:1 to about 10:1.

11. The method of claim 10 wherein the surfactant thinner is added to the drilling fluid during preparation of the fluid and the co-thinner is added to the drilling fluid during drilling.

12. The method of claim 10 wherein the surfactant thinner and the co-thinner are both added to the drilling fluid during preparation of the fluid.

13. The method of claim 10 wherein the surfactant thinner and the co-thinner are both added to the drilling fluid during drilling.

14. The method of claim 1 wherein the surfactant thinner is added to the drilling fluid in quantities ranging from about 0.5 pounds to about 15.0 pounds per barrel of the drilling fluid.

15. The method of claim 1 wherein the surfactant thinner is added to the drilling fluid during drilling in sufficient amounts to reduce the viscosity of the fluid during drilling such that the plastic viscosity of the fluid is maintained during drilling in the range of about 10 cP to about 60 cP, the yield point of the fluid is maintained during drilling in the range of about 5 lb/100 ft² to about 40 lb/100 ft² when measured at about 122° F. (50° C.), and the yield point of the fluid is maintained during drilling in the range of about 5 lb/100 ft² to about 75 lb/100 ft² when measured at about 40° F. (4° C.).

16. A drilling fluid comprising:
a continuous oil phase;
water dispersed in the oil phase;
solids insoluble in the oil phase; and
at least one non-ionic surfactant thinner,
wherein the non-ionic surfactant thinner is the reaction product of ethylene oxide, propylene oxide and/or butylene oxide with $C_{10-22}$ carboxylic acids or $C_{10-22}$ carboxylic acid derivatives containing at least one double bond in position 9, 10, 13, or 14 having structural units of the general formula (I):

where $R_1$ is a hydrogen atom, or an OH group, or a group $OR_2$, and where $R_2$ is an alkyl group of about 1 to about 18 carbon atoms, or an alkenyl group of about 2 to about 18 carbon atoms, or a group of the formula (II):

where $R_3$ is a hydrogen atom, or an alkyl group of about 1 to about 21 carbon atoms, or an alkylene group of about 2 to about 21 carbon atoms; and
wherein the surfactant thinner is added to the fluid in quantities ranging from about 0.5 pounds to about 15.0 pounds of surfactant per barrel of fluid, such that the fluid has a plastic viscosity in the range of about 10 cP to about 60 cP and a yield point in the range of about 5 lb/100 ft² to about 40 lb/100 ft² when measured at about 122° F. (50° C.), and a yield point in the range of about 5 lb/100 ft² to about 75 lb/100 ft² when measured at about 40° F. (4° C.).

17. The drilling fluid of claim 16 wherein the continuous oil phase comprises compounds or compositions selected from the group consisting of:

(a) carboxylic esters of the formula: R'—COO—R" where R' is a saturated or unsaturated, linear or branched, alkyl radical having about 1 to about 23 carbon atoms and R" is an alkyl radical, branched or unbranched, saturated or unsaturated, having about 1 to about 23 carbon atoms;

(b) linear or branched olefins having about 8 to about 30 carbon atoms;

(c) water-insoluble symmetric or asymmetric ethers of monohydric alcohols of natural or synthetic origin, said alcohols containing about 1 to about 24 carbon atoms;

(d) water-insoluble alcohols of the formula: R'"—OH where R'" is a saturated, unsaturated, linear or branched alkyl radical having about 8 to about 24 carbon atoms; and (e) carbonic diesters.

18. The drilling fluid of claim 17 wherein one or more compounds or compositions from said group comprise about 50% to about 100% of the oil phase by volume.

19. The drilling fluid of claim 16 wherein the drilling fluid comprises about 15% to about 35% by volume water and about 75% to about 65% by volume oil.

20. The drilling fluid of claim 16 wherein the quantity of surfactant thinner in the drilling fluid ranges from about 1.5 lbs/barrel to about 3 lbs/barrel.

21. The drilling fluid of claim 16 further comprising a co-thinner compound having the formula:

$$R-(C_2H_4O)_n(C_3H_6O)_m(C_4H_8O)_k-H$$

where R is a saturated or unsaturated, linear or branched alkyl radical having about 8 to about 24 carbon atoms, n is a number ranging from about 1 to about 10, m is a number ranging from about 0 to about 10, and k is a number ranging from about 0 to about 10, and wherein the surfactant thinner and the co-thinner compound are present in the drilling fluid in a ratio ranging from about 1:1 to about 10:1.

* * * * *